(12) United States Patent
Basu et al.

(10) Patent No.: US 11,978,044 B2
(45) Date of Patent: May 7, 2024

(54) CLIENT AUTHENTICATION USING SPLIT KEY SIGNING ON A BLOCKCHAIN PLATFORM

(71) Applicant: 0Chain Corp., Cupertino, CA (US)

(72) Inventors: Saswata Basu, Cupertino, CA (US); Siva Dirisala, Cupertino, CA (US)

(73) Assignee: OCHAIN CORP., Cupertino, CA (US)

(*) Notice: Subject to any disclaimer, the term of this patent is extended or adjusted under 35 U.S.C. 154(b) by 534 days.

(21) Appl. No.: 17/228,399

(22) Filed: Apr. 12, 2021

(65) Prior Publication Data

US 2022/0173917 A1 Jun. 2, 2022

Related U.S. Application Data

(62) Division of application No. 16/369,656, filed on Mar. 29, 2019, now abandoned.

(51) Int. Cl.
*H04L 9/32* (2006.01)
*G06F 21/60* (2013.01)
(Continued)

(52) U.S. Cl.
CPC ....... *G06Q 20/3829* (2013.01); *G06F 21/602* (2013.01); *G06F 21/6209* (2013.01);
(Continued)

(58) Field of Classification Search
CPC ............... G06Q 20/3829; G06Q 20/36; G06Q 20/3674; G06Q 20/389; G06Q 2220/00; G06Q 20/02; G06Q 20/38215; G06Q 20/3825; G06Q 20/4014; G06F 21/602; G06F 21/6209; G06F 21/6218;
(Continued)

(56) References Cited

U.S. PATENT DOCUMENTS

2018/0205743 A1* 7/2018 McIver ............... H04L 9/14
2019/0372762 A1 12/2019 Shainski et al.
(Continued)

OTHER PUBLICATIONS

Giuseppe Ateniese, Kevin Fu, Matthew Green, and Susan Hohenberger, Improved Proxy Re-encryption Schemes with Applications to Secure Distributed Storage, in Proceedings of the Network and Distributed System Security Symposium, NDSS 2005, San Diego, California, USA, 2005, https://eprint.iacr.org/2005/028.pdf, 25 pages total.
(Continued)

*Primary Examiner* — Jeffrey C Pwu
*Assistant Examiner* — Nega Woldemariam
(74) *Attorney, Agent, or Firm* — Levine's Tech Consulting LLC; Frank E. Levine

(57) ABSTRACT

An approach is disclosed on a blockchain platform for authenticating clients. A public and private key is created at a client device. The private key into is split two or more parts. The split private key part is split into to two or more client devices including a first client device and a remaining client devices. Signing to authenticate a challenge to login using a partial key part occurs at the first client device. The challenge is sent to the remaining client devices wherein the remaining client devices that sequentially sign using short range wireless network connection and respond back to the challenge to login without a password.

2 Claims, 11 Drawing Sheets

(51) Int. Cl.
| | |
|---|---|
| G06F 21/62 | (2013.01) |
| G06Q 20/36 | (2012.01) |
| G06Q 20/38 | (2012.01) |
| H04L 9/06 | (2006.01) |
| H04L 9/08 | (2006.01) |
| H04L 9/30 | (2006.01) |
| H04L 9/40 | (2022.01) |
| H04W 4/80 | (2018.01) |
| H04W 76/10 | (2018.01) |
| H04L 9/00 | (2022.01) |

(52) U.S. Cl.
CPC ......... *G06F 21/6218* (2013.01); *G06Q 20/36* (2013.01); *G06Q 20/3674* (2013.01); *G06Q 20/389* (2013.01); *H04L 9/0637* (2013.01); *H04L 9/0643* (2013.01); *H04L 9/085* (2013.01); *H04L 9/0891* (2013.01); *H04L 9/3073* (2013.01); *H04L 9/3247* (2013.01); *H04L 9/3271* (2013.01); *H04L 63/1458* (2013.01); *H04L 63/20* (2013.01); *H04W 4/80* (2018.02); *H04W 76/10* (2018.02); *G06F 2221/2101* (2013.01); *G06Q 2220/00* (2013.01); *H04L 9/50* (2022.05)

(58) Field of Classification Search
CPC ............. G06F 2221/2101; G06F 21/64; H04L 9/0637; H04L 9/0643; H04L 9/085; H04L 9/0891; H04L 9/3073; H04L 9/3247; H04L 9/3271; H04L 63/1458; H04L 63/20; H04L 9/50; H04L 63/065; H04L 9/3239; H04L 9/3255; H04L 63/0478; H04L 63/0823; H04W 4/80; H04W 76/10
USPC .......................................................... 726/6
See application file for complete search history.

(56) References Cited

U.S. PATENT DOCUMENTS

| | | | |
|---|---|---|---|
| 2020/0162246 A1* | 5/2020 | Schouppe | ............... H04L 9/085 |
| 2021/0112117 A1 | 4/2021 | Munson et al. | |

OTHER PUBLICATIONS

Daniel J. Bernstein, Curve25519: New Diffie-Hellman speed records, in Public Key Cryptography—KC 2006, 9th International Conference on Theory and Practice of Public-Key Cryptography, New York, NY, USA, Apr. 24-26, 2006, Proceedings, pp. 207-228, 2006, https://cr.yp.to/ecdh/curve25519-20060209.pdf, 22 pages total.

Matt Blaze, Gerrit Bleumer, and Martin Strauss, Divertible Protocols and Atomic Proxy Cryptography, In Advances in 2, Cryptology—EUROCRYPT '98, International Conference on the Theory and Application of Cryptographic Techniques, Espoo, Finland, May 31-Jun. 4, 1998, Proceedings, pp. 127-144, 1998, https://link.springer.com/content/pdf/10.1007%2FBFb0054122.pdf, 18 pages total.

Isaac Agudo David Nuez and Javier Lopez, A Parametric Family Of Attack Models For Proxy Reencryption, 4 2, Cryptology ePrint Archive, Report 2016/293, 2016. https://eprintiacr.org/2016/293, 24 pages total.

Taher El Gamal, A Public Key Cryptosystem And A Signature Scheme Based On Discrete Logarithms EEE Trans, Information Theory, 31(4):469-472, 1985, https://caislab.kaist.ac.kr/lecture/2010/spring/cs548/basic/B02.pdf, 9 pages total.

Hartwig Mayer, Ecdsa Security in Bitcoin and Ethereum: A Research Survey, CoinFaabrik, Jun. 28, 2016, https://blog.coinfabrik.com/wp-content/uploads/2016/06/ECDSA-Security-in-Bitcoin-and-Ethereum-a-Research-Survey.pdf, 10 pages total.

David Nu-Nez, Isaac Agudo, and Javier Lopez. Proxy Re-Encryption: Analysis of Constructions and its Application to Secure Access Delegation, J. Network and Computer Applications, 87:193-209, 2017, https://nics.uma.es/pub/papers/nunez2017proxy.pdf, 21 pages total.

S. Sharmila Deva Selvi, Arinjita Paul, and C. Pandu Rangan, An Efficient Non-Transferable Proxy E-Encryption Scheme, In Applications and Techniques in Information Security—8th International conference, ATIS 2017, Auckland, New Zealand, Jul. 6-7, 2017, Proceedings, pp. 35-47, 2017, 13 pages total.

S. Sharmila Deva Selvi, Arinjita Paul, and Chandrasekaran Pandu Rangan, A Provably-Secure Unidirectional 3roxy Re-Encryption Scheme Without Pairing in the Random Oracle Model, In CANS, vol. 11261 of Lecture Notes in Computer Science, pp. 459-469, Springer, 2017, 22 pages total.

Kaitai Liang, Cheng-Kang Chu, Xiao Tan, Duncan S. Wong, Chunming Tang, Jianying Zhou, Chosen-Ciphertext secure multi-hop identity-based conditional proxy re-encryption with constant-size ciphertexts, Theoretical Computer Science 539, Elsevier, pp. 87-105, 2014, http://users.ics.aalto.fi/ktliang/PDF/TCS2014.pdf, 19 pages total.

Varsha S. Agme, Prof. Archana C. Lomte, Cloud Data Storage Security Enhancement Using Identity Based Encryption, Int. Journal of Application or Innovation in Engineering & Management (I JAI EM), vol. 3, issue 4, ISSN 2319-4847, pp. 340-345, all pages, Apr. 2014, 6 pages total.

Jiale Zhang, Bing Chen, Yanchao Zhao, Xiang Cheng, and Feng Hu, Data Security and Privacy-Preserving in Edge Computing Paradigm: Survey and Open Issues, IEEE Access, vol. 6, pp. 18209-18237, all pages, 2018, 29 pages total.

Shyam Nandan Kumar, Amit Vajpayee, A Survey on Secure Cloud: Security and Privacy in Cloud Computing, in American Journal of Systems and Software, vol. 4, No. 1, 14-26, Science & Education Publishing (SciEP) , all pages, 2016, https://citeseerx.ist.psu.edu/viewdoc/download?doi=10.1.1.707.3980&rep=rep1&type=pdf, 13 pages total.

Ujjwal Guin,Pinchen Cui, and Anthony Skjellum, Ensuring Proof-of-Authenticity of IoT Edge Devices using Blockchain Technology, in 2018 IEEE Confs on Internet of Things( IoT), Green Computing and Communications, Cyber, Physical and Social Computing, Smart Data, Blockchain, Computer and Information Technology, Congress on Cybermatics, IEEE, pp. 1042-1049, all pages, 2018, https://www.eng.auburn.edu/~uguin/pdfs/Blockchain-2018.pdf, 8 pages total.

Kaitai Liang, Man Ho Au, Joesph K. Liu, Willy Susilo, Duncan S. Wong, Guomin Yang, Yong Yu, and Anjia Yang, A secure and efficient Ciphertext-Policy Attribute-Based Proxy Re-Encryption for cloud data sharing, in Future Generation Computer Systems 52, Elsevier B.V., pp. 95-108, 2015, www.elsevier.com/locate/fgcs, 14 pages total.

\* cited by examiner

| Algorithm | CPA-Secure El-Gamal Scheme | Our CCA secure SE Scheme |
|---|---|---|
| Key Generation | 612.947 | 591.677 |
| Encryption | 420.307 | 65.416 |
| Decryption | 300.652 | 41.65 |

Table 1: Performance Evaluation of the CPA secure El-Gamal encryption scheme and our Self-Encryption Scheme. (All timings reported are in microseconds.)

| Algorithm | CCA-Secure Selvi et al. Scheme | Our CCA secure SE-PRE Scheme |
|---|---|---|
| Key Generation | 714.271 | 579.702 |
| First Level Encryption | 1044.605 | 87.85 |
| First Level Decryption | 1654.78 | 60.356 |
| Re-Encryption Key Generation | 478.368 | 796.036 |
| Re-Encryption | 1087.52 | 23.216 |
| Re-Decryption | 1077.05 | 745.081 |

Table 2: Performance Evaluation of the efficient pairing-free unidirectional PRE scheme due to Chow et al. and our Scheme. (All timings reported are in microseconds.)

FIG. 2

CLIENT AUTHENTICATION USING SPLIT KEY SIGNING ON A BLOCKCHAIN PLATFORM

If an Application Data Sheet (ADS) has been filed for this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)). In addition, the present application is related to the "Related Applications," if any, listed below.

RELATED APPLICATIONS

This application is related to co-pending patent application Ser. No. 16/247,994 filed on Jan. 15, 2019.

FIELD OF THE INVENTION

The present invention is in the technical field of cloud computing. More particularly, the present invention is in the technical field of blockchain platform. More particularly, the present invention is in the technical field of proxy re-encryption, multiple signatures and passwordless login.

BACKGROUND

Internet is a global computer network providing a variety of information and communication facilities, consisting of interconnected networks using standardized communication protocols. Internet is not owned by a single entity and it operates without a central governing body. The same principles of distributed governance were applied to digital currencies by providing ability to perform digital transactions that existed without support from any underlying institution. The digital ledger that records the transactions in a chain using a mathematical hierarchy is called a blockchain. The following paragraphs describe different scenarios that exist today in the context of cloud computing and blockchain environments and systems.

As a background, a proxy server acts as a gateway or an intermediary server separating end users from the websites they browse. Using a proxy server helps with controlling internet usage of employees and children, bandwidth savings, improved speeds, privacy benefits, improved security and access to blocked resources by pretending to be at another geographical location. Proxy Re-Encryption is a specialized cryptographic primitive that facilitates a user to share his encrypted file with another user without decrypting the file using a specialized key called Re-Encryption Key (ReKey). Proxy controls which ciphertext of the user needs to be translated or re-encrypted. There are no mechanisms known in the industry that allow flexible user control to proxy reencryption.

The current model of cloud storage is operated through centralized authorities, which makes such a system susceptible to single point failures and permanent loss of data. Blockchain technology, initially designed as a financial ledger has attracted the attention of researchers in a wide range of applications requiring accountable computing and auditability. Blockchain enabled distributed peer-to-peer cloud storage solutions are steadily replacing its centralized counterpart. A blockchain provides multiple parties to agree upon transactions and contracts in an immutable and auditable way. Decentralized applications such as dApp providers make use of this capability to provide services that are transacted in a publicly verifiable manner. When the service provided by the dApp is not directly from the dApp owner itself but from other third parties, it brings up additional challenges. How would the end user using the dApp trust that the unknown third party service provides used by the dApp are trust worthy? The current approaches in the industry use a combination of unencrypted to cumbersome ways.

While there are policies in the industry that provide end-to-end user flexibility in securing content from authoring to distribution, none of them offer flexibility in a blockchain setup where there is no single entity on the cloud controlling access. While most systems offer securing content, they may fall short of providing an independently verifiable audit capability. In a world of increasing cyber crime and digital fraud, when something goes wrong, it requires a lot of time and effort to do digital forensic investigation. Blockchains can help reduce this burden by ensuring tamper-proof auditability is part of the enterprise workflows.

While there are means to enable shared smart contracts, a wallet is typically assigned to a single person or entity. For an entity hosting a smart wallet, there may be more than one person who has the access rights to make decisions of spending or buying on that smart wallet. In such a situation, the entity smart wallet authentication system is vulnerable if passwords are shared by two or more people. Such a vulnerability could also exist for a smart wallet associated with a household that has two or more members with access privileges.

Most of the existing and prevalent authentication methods rely on password-based authentication. Enterprises already use a single-sign on to make it easy for their employees to login to their various internal applications that each require login. Some require changing the password every few weeks or months. Some even prevent reusing the previous 10 passwords, making it extremely painful to employees. While this improves the security, it imposes unnecessary burden on the employees. There is no simple, seamless and effortless method to provide access without compromising on the level of security provided. With cybersecurity and privacy laws, enterprises have a higher need to provide a higher level security.

SUMMARY

The present invention is systems and methods on a blockchain platform for one or more intermediaries comprising: receiving a ciphertext from a first user with condition parameters that has been encrypted with a dynamically selected encryption algorithm; receiving a re-encryption key for a second user from the first user; identifying whether the ciphertext is valid; re-encrypting the ciphertext; outputting the re-encrypted ciphertext only if the ciphertext is valid; and achieving security against chosen ciphertext attack and distributed denial-of-service attack; sending the re-encrypted ciphertext to the second user for decryption.

The system and method for intermediaries, wherein the intermediary does not have the ability to decrypt the received ciphertext.

The system and method for intermediaries, further comprising: skipping outputting the re-encrypted ciphertext based on one or more condition parameters.

The system and method for intermediaries, further comprising: sending the re-encrypted ciphertext to a second intermediary for second hop re-encryption.

A system and method of a blockchain platform for an intermediary, comprising: receiving an encrypted file from a user for storage on the blockchain platform; mapping the user to be the owner of the encrypted file; receiving one or more security policy parameters for the encrypted file from the owner; enforcing the security policy parameters for all access requests to the file on the blockchain platform; and optionally providing audit report of the encrypted file storage and access.

The system and method for intermediaries, wherein the owner is established using past read or write transactions performed directly on the blockchain platform.

The system and method for intermediaries, further comprising: dividing the encrypted file into two or more parts before sending for storage on the blockchain platform.

A system and method of a blockchain platform for a smart wallet, comprising: receiving two or more votes for proposals of a transaction to a smart wallet; authenticating two or more senders of the votes using signatures wherein the signatures use Shamir's secret sharing; validating and finalizing the transaction only after a required number of votes are received.

The system and method of the smart wallet, further comprising: setting an expiry time for the transaction; deleting the transaction if not validated and finalized before the expiry time.

A system and method of blockchain platform for authenticating clients, comprising of: creating a public and private key at a client device; splitting the private key into two or more parts; assigning the split private key part to two or more client devices; signing to authenticate a challenge using a partial key part at one of the client devices; sending the challenge to the remaining client devices who sequentially sign using short range wireless network connection; responding back to the challenge to login without a password.

BRIEF DESCRIPTION OF THE DRAWINGS

The embodiments of this invention are illustrated by way of example and not limitation in the figures of the accompanying drawings, in which like references indicate similar elements and in which:

FIG. 2 shows Table 1 and Table 2. Table 1 discloses Performance Evaluation of the CPA secure El-Gamal Encryption Scheme and disclosed Self-Encryption Scheme. Table 2 discloses Performance Evaluation of the efficient pairing-free unidirectional PRE scheme due to Chow et al., and disclosed Scheme.

DETAILED DESCRIPTION OF THE INVENTION

The systems and methods on a blockchain platform for intermediaries and passwordless login allow for intermediary proxy re-encryption, independent audits, secure multiple persons controlled smart contract or smart wallet, and split-keys short-range wireless device-based and passwordless client authentication. One or more entities (or service providers) that help or manage the self-regulation on the blockchain platform are miners. A client is an end-user with two or more computing devices who initiates the requests and wants to commit transactions on the blockchain platform. An intermediary may be a blobber or a sharder who uses a computing device that processes the applications on the blockchain platform.

Different embodiments described herein include components or structures to perform the described functionality. A "component" or a "module" as used in this invention disclosure, includes a dedicated or shared processor and, typically, firmware or software modules executed by the processor. Depending upon implementation-specific or other considerations, a module can be centralized or its functionality distributed. A component or a module can include special purpose hardware, firmware, or software embodied in a computer-readable medium for execution by the processor.

Figure 1:
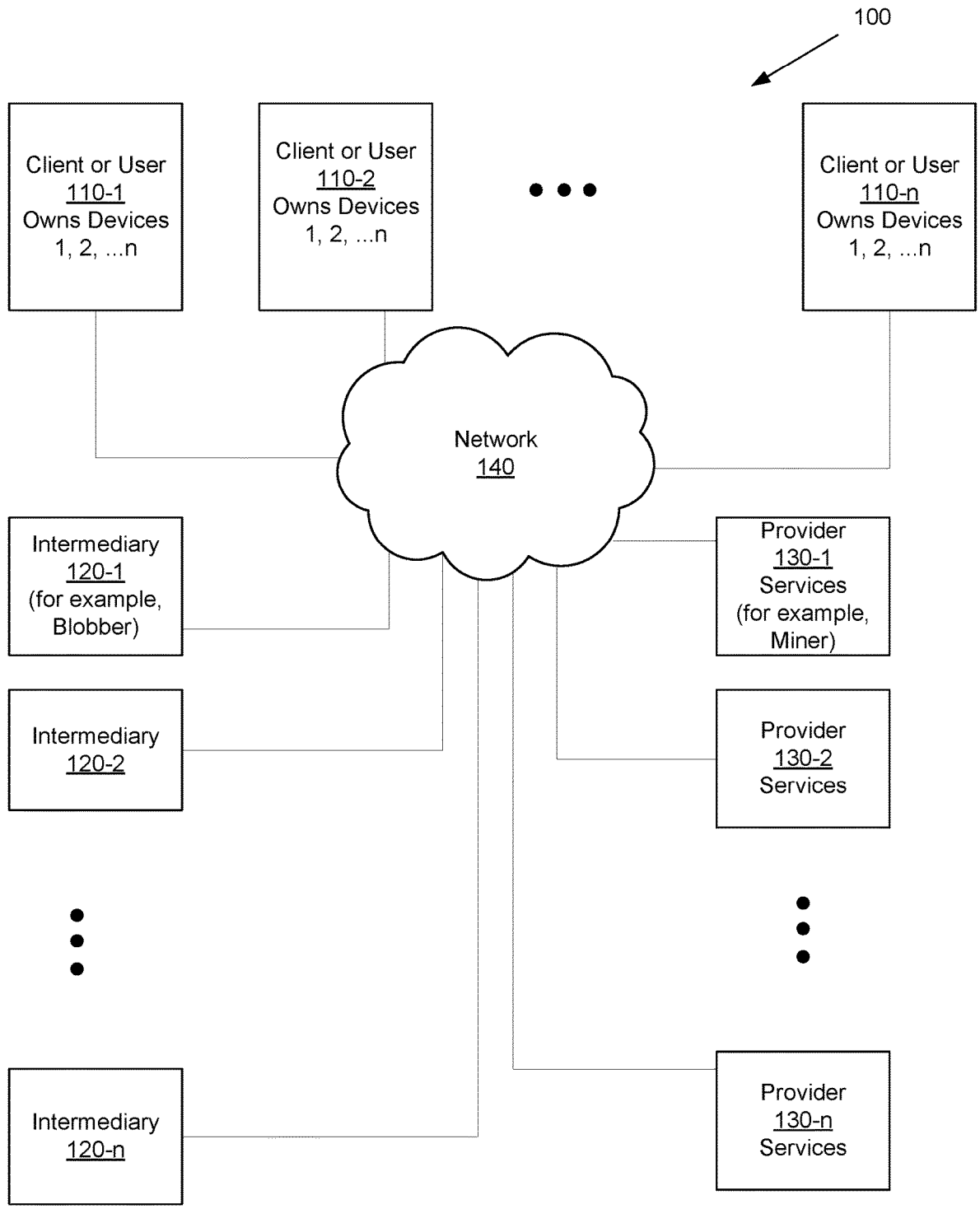
FIG. 1 shows a diagram illustrating an example of a system and method on a blockchain platform with intermediaries, clients and service providers.

In one embodiment, FIG. 1 depicts a diagram 100 illustrating an example on a blockchain platform with intermediaries. In the example of FIG. 1, the environment includes a first consumer or client system 110-1 through an nth client system 110-$n$ wherein each client owns two or more devices 1, 2, 3, . . . n, network 140, intermediary system 120-1 through an nth intermediary system 120-$n$ and a service provider 130-1 through an nth system 130-$n$. In an implementation, the client system 110 includes components related to requesting services from the blockchain platform. In one implementation, the client system 110 requests and uses a storage application for storage, read or write. The client may use a multiple signatures or group-based smart-contract or smart-wallet on the blockchain platform. The client may use passwordless authentication using split keys that are associated with two or more client devices. The client may request audit reporting for any of its transactions including storage read/write requests or adding/deleting of tokens from a smart contract or smart wallet.

The intermediary provides enforcement to parameters set with flexibility by a client including security policies on an encrypted file owned by a client. The intermediaries operate securely on the blockchain platform. The clients can delegate reencryption and use intermediaries as proxies. The intermediary can be providing proxy services, audit reporting server, enforcing multiple signatures on a smart contract or a smart wallet, provider of server-side passwordless authentication.

The service provides provide the underlying blockchain platform basic operations functionality. The blockchain platform may operate on a token-based transaction system. For example, in one embodiment, the service providers manage tokens when using a resource on the blockchain or when providing service.

Network 140 can be different wireless and wired networks available to connect different computer devices including client and server systems. In an implementation, network 140 is publicly accessible on the internet. In an implementation, network 140 is inside a secure corporate wide area network. In an implementation, network 140 allows connectivity of different systems and devices using a computer-readable medium. In an implementation, the blockchain platform allows users on the client system, the blobber, the sharder or the miner to have customized applications and operational framework.

The messaging and notification between different components can be implemented using application programming interface (API) calls, extensible markup language ("XML") interfaces between different interfaces, Java/C++ object oriented programming or simple web-based tools. Different components may also implement authentication and encryption to keep the data and the requests secure.

I. Sharing of Encrypted Files on Blockchain Using Pre

The recent explosion of data volumes and demand for computing resources have prompted individuals and organizations to outsource their storage and computation needs to online data centers, such as cloud storage. While data security is enforced by standard public-key encryption mechanisms in the cloud, secure data sharing is enabled by efficient cryptographic primitives such as proxy re-encryption (PRE). PRE enables re-encryption of ciphertexts from one public key into another via a semi-trusted third party termed proxy, who does not learn any information about the underlying plaintext. A user can delegate access to his files by constructing a special key, termed as re-encryption key, using which the proxy performs the ciphertext transformation towards a legitimate delegate. PRE systems can be classified into unidirectional and bidirectional schemes based on the direction of delegation. They can also be classified into single-hop and multi-hop schemes based on the number of re-encryptions permitted. In this work, we focus on unidirectional and single-hop PRE schemes.

Using dApp called 0Box, a storage dApp allows any user to upload and share their files to their friends and families similar to many other popular storage services. However, most existing services trust the service provider and upload the content without any encryption. But 0box strives to provide zero-knowledge storage such that the third-party storage providers will not know the uploaded content. This is achieved using an efficient CCA-secure proxy re-encryption scheme, outlined in this paper. When a user shares the encrypted content with a trusted party, he provides the reencryption keys using the public key of the trusted party so that only that party is able to decrypt the content. By facilitating the associated transactions on the blockchain, this scheme provides an end-to-end transparency and security for end users to procure storage services at highly competitive prices without worrying about the reputation of the storage providers. We first propose a novel self-encryption (SE) scheme, which is much more efficient than the standard CPA secure El-Gamal encryption scheme. This work is further extended to design a CCA-secure proxy re-encryption scheme (SE-PRE) that adds re-encryption functionality to self-encryption. Our PRE design is much more efficient than the schemes known in the industry.

We give the definitions of various assumptions adopted for proving the security of the proposed schemes, the general and security model of SE and SE-PRE schemes. (1) Definition 1. Discrete Logarithm Problem (DLP): The discrete logarithm problem in a cyclic group G of order q is, given (q; P; Y) such that q is a large prime, P; Y∈G, find a∈$Z^*_q$ such that Y=aP. (2) Definition 2. Computation Diffie Hellman Problem (CDH): The Computation Diffie Hellman Problem in a cyclic group G of order q is, given (q; P; aP; bP) such that q is a large prime, P; aP; bP∈G, find Q such that Q=abP, where a∈$Z^*_q$.

The self encryption (SE) is a novel primitive that allows a user to store their files securely with minimal computation overhead. This primitive is different from the traditional public key encryption approach as encryption can be done only by the owner of the file who possess the private key related to the public key which is used for encrypting the file. It has the following algorithms: (1) Setup, (2) KeyGen, (3) Self-Encrypt, and (4) Self-Decrypt. Setup(k) algorithm is run by the trusted entity. On input of a security parameter k, the Setup algorithm will output the system parameters Params. KeyGen(Ui, Params) algorithm is run by the user Ui. This is used to generate a public and private key pair ($PK_i$; $SK_i$) for the user Ui. Self-Encrypt(m, $t_w$, $SK_i$, $PK_i$, Params) is an encryption algorithm is run only by the user Ui. This algorithm requires the knowledge of the private key $SK_i$ corresponding to the public key $PK_i$ of user Ui. This takes as input the message m, the tag $t_w$, the private key $SK_i$ and public key $PK_i$ of user Ui. It will output a ciphertext C which is the encryption of message m under the public key $PK_i$ and tag $t_w$. This approach different from the traditional public key encryption where the encrypt algorithm can be run by any user. Self-Decrypt(C, $SK_i$, $PK_i$, Params): The decryption algorithm is run by the user $U_i$. On input of the ciphertext C, the private key $SK_i$ and the public key $PK_i$ of user $U_i$, this will output the message m if C is a valid self encryption of m under $PK_i$, $SK_i$ and $t_w$. Otherwise, it returns ⊥. In one embodiment, the generic model of Self Encryption algorithms consists of the algorithms described in this paragraph.

The SE-PRE is a proxy re-encryption primitive that uses a self encryption scheme as the base algorithm and provides a mechanism to delegate the self-encrypted ciphertext. The SE-PRE scheme consists of the following algorithms: 1. Setup(k): The setup algorithm takes as input a security parameter k. This will output the system parameters Params. This algorithm is run by a trusted party. 2. KeyGen(Ui, Params): The key generation algorithm generates a public and private key pair ($PK_i$; $SK_i$) of user Ui. This algorithm is run by a user Ui. 3. ReKeyGen($SK_i$; $PK_i$; $PK_j$; $c_w$; Params): The re-encryption key generation algorithm takes as input a private key $SK_i$ of delegator $U_i$, public key $PK_i$ of delegator $U_i$, public key $PK_i$ of delegate $U_j$ and condition $c_w$ under which proxy can re-encrypt. It outputs a re-encryption key $RK_{i \to j}$. This is executed by the user $U_i$. 4. Self-Encrypt(m, $t_w$, $SK_i$, $PK_i$, Params): The self encryption algorithm takes as input the message m, the tag $t_w$, the private key $SK_i$ of user Ui and public key $PK_i$ of the user Ui. It outputs a ciphertext C which is the encryption of message m under the public key $PK_i$, private key $SK_i$ and tag $t_w$. This algorithm is executed by the user $U_i$. 5. Re-Encrypt(C; $PK_i$; $PK_j$; $c_w$; $RK_{i \to j}$; Params): The re-encryption algorithm takes as input a self-encrypted ciphertext C, the delegator's public key $PK_i$, the delegate's public key $PK_j$, the condition $c_w$ and a re-encryption key $RK_{i \to j}$ corresponding to $c_w$. It outputs a ciphertext D which is the encryption of same m under public key $PK_j$ of user $U_j$. This is run by a proxy who is provided with the re-encryption key $RK_{i \to j}$. 6. Self-Decrypt(C, $SK_i$, $PK_i$, Params): The self decryption algorithm is run by the user $U_i$. This will take as input the ciphertext C, the private key $SK_i$ of user $U_i$ and public key $PK_i$ of user $U_i$. It will output the message m if C is a valid encryption of m under $PK_i$ and $Sk_i$ of user $U_i$ and tag $t_w$. If C is not valid, this algorithm returns $\perp$. 7. Re-Decrypt(D, $SK_j$, Params): The re-decryption algorithm takes as input a re-encrypted ciphertext D and a private key $SK_j$ of user $U_j$. It outputs a message m$\in$M, if D is a valid re-encrypted ciphertext of message m or the error symbol $\perp$ if D is invalid. This algorithm is run by the user $U_j$. In one embodiment, the generic model of proxy re-encryption with self-encryption (SE-PRE) includes algorithms described in this paragraph.

The security model gives details about the restrictions and oracle accesses given to the adversary. It is modelled as a game between a challenger C and an adversary A. The security of Self-Encryption (SE) scheme against chosen ciphertext attacks (IND-SE-CCA) is demonstrated as a game between an adversary A and a challenger C. The game is as follows: (1) Setup: C takes a security parameter k and runs the Setup(k) algorithm to generate the system parameters Params. It provides Params to A. C then runs KeyGen(U; Params) to generate a private and public key pair SK; PK of user U and provides PK to A. SK is kept by A. (2) Phase-1: A can adaptively issues queries to the following oracles provided by C: Self-Encrypt(m; $t_w$) Oracle: C runs the Self-Encrypt(m, $t_w$, SK, PK, Params) algorithm to generate the ciphertext C and returns it to A. Self-Decrypt(C, PK) Oracle: C runs the Self-Decrypt(C, SK, PK, Params) and returns the output to A. (3) Challenge: After getting sufficient training, A submits two messages m0 and m1 from M of equal length and a tag $t_w$* to C. C picks a random bit $\delta \in \{0; 1\}$ and outputs the ciphertext C*=Self-Encrypt($m_\delta$; $t_w$*, SK; PK). (4) Phase-2: On receiving the challenge C*, A is allowed to access the various oracles provided in Phase-1 with the restrictions given below: (i). Self-Decrypt(C*) query is not allowed. (ii) Self-Encrypt($m_\delta$; $t_w$*) query is not allowed. (5) Guess: After getting sufficient training, A will output its guess. A wins the game if $\delta = \delta'$. In one embodiment, the security model for self-encryption includes algorithms described in this paragraph.

Security model for the SE-PRE scheme is described below. The model involves the security of original ciphertext as well as transformed ciphertext. The ciphertext that can be re-encrypted is called the original ciphertext and the output of the re-encryption is called the transformed ciphertext. Security of Original Ciphertext: The security of Proxy Re-Encryption with Self-Encryption (SE-PRE) against chosen ciphertext attacks (IND-SE-PRE-CCAO) for the original ciphertext is modelled as a game between an adversary A and a challenger C. The security game is described below: (1) Setup: C takes a security parameter k and runs the Setup(k) algorithm to generate the system parameters Params. The Params is then given to A. (2) Phase-1: On receiving the system parameters, a target public key $PK_T$ and tag $t_w$*, A is allowed to access Keygen, Self-Encrypt, Self-Decrypt, Rekey, Re-Encrypt, Re-Decrypt algorithms. A simulates the algorithms as oracles and A can adaptively issue queries to these oracles. The various oracles provided by C are: (a) Corrupted KeyGen($U_i$): C runs the KeyGen($U_i$; Params) to obtain the public and private key pair ($PK_i$; $SK_i$). C returns both $SK_i$ and $PK_i$ to A. (b) Uncorrupted KeyGen($U_i$): C runs the KeyGen($U_i$; Params) to obtain the public and private key pair ($PK_i$; $SK_i$) and returns $PK_i$ to A. $SK_i$ is not provided to A. (c) ReKeyGen($U_i$; $U_j$): C runs the ReKeyGen($SK_i$; $PK_i$; $PK_j$; $c_w$; Params) to obtain the re-encryption key $RK_i!_j$ and returns it to A. (d) Self-Encrypt(m; $t_w$; $PK_i$): C runs the Self $\square$Encrypt(m, $t_w$, $SK_i$, $PK_i$, Params) to obtain the ciphertext C and returns it to A. (e) Re-Encrypt(C, $PK_i$, $PK_j$, $c_w$): C runs the Re-Encrypt (C; $PK_i$; $c_w$; $RK_i!_j$; Params) to obtain the ciphertext D and returns it to A. Here, $RK_i!_j$ is the re-encryption key from $PK_i$ to $PK_j$ under the condition $c_w$. (f) Self-Decrypt(C, $PK_i$): C runs the Self-Decrypt(C, $SK_i$, $PK_i$, Params) and returns the output to A. (g) Re-Decrypt(D, PK): C runs the Re-Decrypt (D, $SK_j$, $PK_j$, Params) and returns the output to A. For the ReKey, Encrypt, Re-Encrypt, Decrypt, Re-Decrypt oracle queries it is required that public keys $PK_i$ and $PK_j$ are generated beforehand. (3) Challenge: On getting sufficient training, A will output two equal-length plaintexts m0, m1 2 M. Here, the constraint is: $PK_T$ is generated using Uncorrupted Keygen and Rekey($PK_T$, $PK_i$, $c_w$); is not queried in Phase-1 for $c_w = t_w$* C flips a random coinf0; 1 g, and sets the challenge ciphertext C*=Self-Encrypt(m, $t_w$*, $SK_T$, $PK_T$, Params). C then provide C* as challenge to A. (4) Phase-2: A can adaptively query as in Phase-1 with the following restrictions: 1. A cannot issue Corrupted KeyGen($U_T$) query. 2. A cannot issue Self-Decrypt(C*, PKT, $t_w$*) query. 3. A cannot issue Re-Encrypt(C*, $PK_T$; $PK_j$) query on C* from $PK_T$ to $PK_j$ if $PK_j$ is Corrupted. 4. A cannot issue ReKey ($PK_T$, $PK_j$; $c_w$) query if $c_w = t_w$*. 5. A cannot issue Re-Decrypt query on D*; $PK_j$ if D* is the output of Re-Encrypt (C*, $PK_T$, $PK_j$, $c_w$) and $c_w = t_w$* (5) Guess: Finally, A outputs a guess $\delta' \in \{0; 1\}$ and wins the game if $\delta' = \delta$.

The security of transformed of Proxy Re-Encryption with Self-Encryption(SE-PRE) scheme against chosen ciphertext attacks(IND-SE-PRE-CCAT) is modelled as a game between an adversary A and a challenger C. This is achieved by: (1) Setup: C takes a security parameter k and runs the Setup(k) algorithm and gives the resulting system parameters Params, a target public key $PK_T$ and tag $t_w$* to A. (2) Phase-1: This phase is similar to the Phase-1 of IND-SE-PRE-CCA$_O$. We do not provide Re-Encrypt oracle as we are providing all the re-encryption keys for the adversary. (3) Challenge: Once A decides Phase-1 is over, it outputs two equal-length plaintexts $m_0$, $m_1 \in M$. C flips a random coin $\delta \in \{0; 1\}$, and sets the challenge ciphertext as follows: (a) Compute C*=Self-Encrypt(m, $t_w$*, $SK_i$, $PK_i$, Params), ($PK_i$; $SK_i$ be the public, private key pair of user $U_i$ and $U_i$ can be honest or corrupt. (b) Sets D*=Re-Encrypt(C*; $RK_{i \to T}$) which is then sent to A. (3) Phase-2: A adaptively issues queries as in Phase-1, and C answers them as before with the following restrictions: (i). A cannot issue Corrupted KeyGen ($U_T$) query. (ii) A cannot issue Re-Decrypt(D*; $PK_T$) query. (4) Guess: Finally, A outputs a guess $\delta' \in \{0; 1\}$ and wins the game if $\delta' = \delta$.

Self-Encrypt scheme is a special kind of encryption primitive that allows a user to store file securely in cloud or any distributed storage. In this approach the owner of the file uses his/her private key to encrypt the file. This significantly reduces the computation involved in storing the file. We provide the self encryption scheme and the prove its CCA security in the random oracle model.

The SE scheme consist of the following algorithms: (1) Setup(κ): Let G be an additive cyclic group of prime order q. Let P be a generator of group G. Let Δ=Sym.Encrypt, Sym.Decrypt be any symmetric key encryption scheme. We may assume that Δ is a symmetric key encryption algorithm that uses messages of block size k. Choose the hash functions, $H_1: \{0,1\}^{I_t} \times Z_q^* \to Z_q^*$
$H_2: Z_q^* \to \{0,1\}^{I_k}$
$H_3: \{0,1\}^{I_m} \times G \to \{0,1\}^{I_3}$ Here $I_t$ is the size of the tag, $I_m$ is the size of the message and $I_k$ is the size of the symmetric key used by the symmetric key encryption scheme Δ. Also, $I_3$ is dependent on the security parameter κ. Output Params=(q; G; P; $H_1$( ); $H_2$( ); $H_3$( ), Δ). KeyGen(U, Params): The KeyGen algorithm generates the public and private key of the user U by performing the following steps: (i) Choose a random integer $$z \xleftarrow{R} \mathbb{Z}_q^*$$

(ii) Output PK={X=Xp} and SK=<x>. Self-Encrypt(m, $t_w$, SK, PK, Params): On input of message m, tag $t_w$, private key SK=x of user U, public key PK=xP of user U and the public parameters Params this algorithm will generate the self encryption as follows:

Choose random $t \in Z_q^*$
Set $h_t = H_1(t_w, x)$.
Set $C_1 = t + h_t$.
Compute Key=$H_2(t)$
$C_2 = \{\hat{C}_i\}_{(for\ i=1\ to\ l)}$ and $\hat{C}_i$=Sym.Encrypt ($M_i$, Key) for all i=1 to l, l is the number of blocks.
Assume that $m = M_1 M_2 \ldots Ml$ where $|M_i|=k$ and k is the block size of Δ.
$C_3 = H_3(m, t)$
Output the ciphertext $C = (C_1, C_2, C_3, t_w)$.

Self-Decrypt(C, $SK_i$, Params): Self decryption algorithm is used to decrypt the files that are previously encrypted by the user U using his/her private key. This algorithm does the following:

$h_t = H_1(t_w, SK_i)$.
$t = C_1 - h_t$
Key=$H_2(t)$
Compute $M_i$=Sym.Decrypt($\hat{C}_1$, Key) for all i=1 to l and construct $m = M_1 M_2 \ldots M_l$.
If $C_3 = H_3$ (m, t) then, output m. Else, Output ⊥.
Correctness of t:

$$RHS = C_1 - h_t$$
$$= (t + h_t) - h_t$$
$$= t;$$
$$= LHS$$

The Security Proof can be given as follows:

Theorem 1. If there exist a (γ,ε) adversary A with an advantage ε that can break the IND-SE-CCA security of the SE scheme, then C can solve the discrete log problem with advantage ε' where, $$\epsilon' \geq \epsilon$$

Proof: In this section we formally prove the security of SE scheme in the random oracle model. The IND-SE-CCA security of the SE scheme is reduced to the discrete logarithm problem(DLP). The challenger A is given with the instance of DLP (i.e. given (q, P, Y) such that q is a large prime, P, Y∈G, find a such that Y=ap.) If there exist an adversary A that can break the IND-SE-CCA security of the SE scheme, then C can make use of A to solve the discrete logarithm problem, which is assumed to be hard. Thus the existence of such adversary is not possible.

The challenger C sets the public key PK=Y (PK=aP) and the corresponding private key SK=x=a (which is not know to C). C then provides PK to A. A then has access to various algorithms of SE and the hash functions as oracles. C simulates the hash functions and the Self-Encrypt, Self-Decrypt algorithms as described below.

Phase-1: A is given to access all the oracles as defined in the security model IND-SE-CCA. Here it should be noted that C which does not have the knowledge of private key SK=a provides the functionalities Self-Encrypt, Self-Decrypt algorithm.

The hash functions involved in the SE scheme are simulated as random oracles. To provide consistent output, C maintains the lists $L_{H_1}$, $L_{H_2}$, and $L_{H_3}$, corresponding to the hash function $H_1$, $H_2$ and $H_3$ involved in the SE scheme.

$H_1$ Oracle: When a query with input ($t_w$, x) is made, the tuple ($t_w$, x, $h_t$) is retrieved from $L_{H_1}$, and $h_t$ is returned, if ($t_w$, x) is already there in $L_{H_1}$ list. Otherwise, C does the following:
If xP=Y, then abort. This is because C obtains the solution to DLP i.e x=a.
Pick $h_t \in \mathbb{G}$.
If $h_t$ is already present in $L_{H_1}$ list, go to previous step.
Store ($t_w$, x, $h_t$) in $L_{H_1}$, list and output $h_t$.

$H_2$ Oracle: When a query with t is made, C the tuple (t, Key) from $LH_2$ List is retrieved and will return Key, if (t) is already present in $L_{H_2}$ list. Otherwise, C does the following:
Pick Key=$\{0, 1\}^{I_k}$
If Key is already present in $L_{H_2}$ list, go to previous step.
Store (t, Key) in $L_{H_2}$ list and return Key.

$H_3$ Oracle: When a query with input (m, T) is made, C retrieves the tuple (m, T, α) from $L_{H_3}$ list and returns α, if (m, T) is already present in $L_{H_3}$, list. Otherwise, C does the following:
Pick $\alpha \in \{0, 1\}^{I_3}$
If α is already present in $L_{H_3}$ list, go to previous step.
Store (m, T, α) in $L_{H_3}$, list and return α.

The Self-Encrypt and Self-Decrypt as well as Challenge Phase, Phase-2 and Guess, according to one embodiment, can be described as follows:

Challenge Phase: After the first phase of training is over, A provides $m_o$, mi∈M, $t_w^*$ such that ($m_o$, $t_w^*$) or ($m_1$, $t_w^*$) was not queried to Self-Encrypt oracle during Phase-1 and provides to C. C now generates the challenge ciphertext C*=Self-Encrypt(m δ, $t_w^*$) and δ∈R {0, 1}

Phase-2: A can interact with all the oracles as in Phase-1 but with the following restrictions,
A cannot make the query Self-Decrypt(C*)
A cannot make the query Self-Encrypt(m δ·$t_w^*$), δ∈(0, 1}
Guess: Once Phase-2 is over. A output its guess δ'. A wins the game if δ=δ'.

Self-Encrypt Oracle: When a Self-Encrypt query is made with (m. $t_w$) as input, C does the following:
  Choose random $t \in \mathbb{Z}_q^*$
  Set $h_t = H_1(t_w, x)$.
  Set $C_1 = t + h_t$.
  Compute Key = $H_2(t)$
  $C_2 = \{\hat{C}_i\}_{(for\ i=1\ to\ l)}$ and $\hat{C}_i = $ Sym.Encrypt ($M_i$, Key) for all i=1 to 1, l is the number of blocks. Assume that $m = M_1 M_2 \ldots M_l$ where $|M_i| = k$ and k is the block size of $\Delta$
  $C3 = H_3(m, t)$
  Output the ciphertext $C = (C1, C2, C3, t_w)$.
  Output the self-encrypted ciphertext C to A.
Self-Decrypt Oracle: When a Self-Decrypt query is made with $C = (C_1, C_2, C_3, t_w)$ as input, C performs the following:
  If C is in $L_{Encrypt}$ list, pick m corresponding to C from the tuple (C, m) in $L_{Encrypt}$ list and output m.
  If (tw, −) is present in $L_{H1}$ list then, retrieve $h_t$ corresponding to $(t_w, -)$ from $L_{H1}$ list. Else, it returns ⊥.
  $T = C_1 - ht$
  Key = $H_2(t)$
  Compute $M_i = $ Sym.Decrypt($\hat{C}_i$, Key) for all i=1 to l and construct $M = M_1, M_2, \ldots M_l$.
  If $C3 = H_3(m, t)$ then, output m. Else, it output ⊥.
Challenge Phase: After the first phase of training is over, A provides $m_o, m_i \in M, t_w^*$ such that $(m_o, t_w^*)$ or $(m_1, t_w^*)$ was not queried to Self-Encrypt oracle during Phase-1 and provides to C.
C now generates the challenge ciphertext $C^* = $ Self-Encrypt(m δ, $t_w^*$) and δ∈R {0,1} Phase-2: A can interact with all the oracles as in Phase-1 but with the following restrictions,
  A cannot make the query Self-Decrypt($C^*$)
  A cannot make the query Self-Encrypt(m δ·$t_w^*$), δ∈ (0, 1)
  Guess: Once Phase-2 is over. A output its guess δ'. A wins the game if δ=δ'.

In one embodiment, the proxy re-encryption with self-encryption scheme is described as follows. The SE scheme is modified such a way that it allows verifiability of ciphertext by proxy during re-encryption without knowing the message. It helps in achieving CCA security of SE-PRE. This also helps in avoiding the DDOS attack being launched on Proxy's service. The proxy is equipped with a method to identify invalid ciphertext so that it will serve its functionality only to valid input. Also, the SE-PRE algorithm can be deployed in a simple and efficient manner than using the traditional PRE schemes available till date. In one embodiment, the SE-PRE uses private encryption algorithm.

The setup algorithm is described as follows
Setup(κ):
  Let $\mathbb{G}$ be an additive cyclic group of prime order q. Let P be a generator of group $\mathbb{G}$.
  Let $\Delta = $(Sym.Encrypt, Sym.Decrypt) be any symmetric key encryption scheme. We may assume that Δ is a symmetric encryption algorithm working on block of size k.
  Choose the hash functions,
    $H_0: \{0, 1\}^{I_t} \to \{0, 1\}^{I_0}$
    $H_1: \{0, 1\}^{I_t} \times \mathbb{Z}_q^* \times \mathbb{G} \to \mathbb{Z}_q^*$
    $H_2: \mathbb{Z}_q^* \to \{0, 1\}^{I_k}$
    $H_3: \{0, 1\}^{I_m} \times \mathbb{Z}_q^* \to \{0, 1\}^{I_3}$
    $H_4: \mathbb{Z}_q^* \times \{0, 1\}^{(I_c+I_3+I_5)} \times \mathbb{G} \to \mathbb{Z}_q^*$
    $H_5: \{0, 1\}^{I_t} \times \mathbb{Z}_q^* \times \mathbb{G} \to \{0, 1\}^{I_5}$
    $H_6: \{0, 1\}^{I_w} \times \mathbb{G} \times \mathbb{G} \times \mathbb{G} \to \mathbb{Z}_q^*$
    $H_7: \mathbb{Z}_q^* \times \sqrt{} \to \mathbb{Z}_q^*$
    $H_8: \mathbb{G} \times \mathbb{G} \to \{0, 1\}^{(I_w+I_p)}$
    $H_9: \{0, 1\}^{I_u} \times \mathbb{Z}_q^* \to \mathbb{Z}_q^*$
    $H_c: \{0, 1\}^* \to \{0, 1\}^{I_c}$ Here $I_t$ is size of the tag. $I_m$ is size of the message, $I_c$ is the size of the ciphertext, $I_p$ is κ and $I_k$ is size of the symmetric key used in the encryption scheme $\Delta$. Also, $I_\omega, I_u, I_o, I_3$ and $I_5$ are dependent on the security parameter κ.
  Output Params=(q, P, $\mathbb{G}$, P, $H_i()_{(for\ i=0\ to\ 9)}$, $H_c()$, $\Delta$)
  The KeyGen and RekeyGen can be described as follows:
  KeyGen($U_i$, Params): The KeyGen algorithm generates the public and private key of the user $U_i$, by performing the following:
    Choose a random integer $x_i \xleftarrow{R} \mathbb{Z}_q^*$ Output $PK_i = (X_i = x_i P)$ and $SK = (x_i)$.
  RekeyGen($SK_i, PK_i, PK_j, c_w$, Params): This algorithm generates the re-encryption key required to translate a ciphertext of user $U_i$ into a ciphertext of user $U_j$. This is run by the user $U_i$. The ciphertext to be re-encrypted is encrypted under the public key $PK_i$ of user $U_i$ and with the condition $c_w$, which are specified by user $U_i$. This algorithm works as follows:
    Choose $\omega \xleftarrow{R} \in (0.1)^{I_w}$ Compute $h_c = H_1(c_w, x_i, X_i) \in \mathbb{Z}_q^*$
    Compute $r = H_6(\omega, x_i, X_j, X_i, X_j) \in \mathbb{Z}_q^*$
    Compute $s = H_7(r, X_j) \in \mathbb{Z}_q^*$
    Compute $\gamma = rX_j$
    Compute the re-encryption key $RK_{i \to j} = (R_1, R_2, R_3, R_4, R_5, R_6)$ where
      $R_1 = s - h_c \in \mathbb{Z}_{q^*}$
      $R_2 = rP \in \mathbb{G}$
      $R_3 = (\omega\|X_i) H_8(\gamma, X_j) \in \{0, 1\}^{I_w+I_g}$
      $R_4 = H_6(\omega, \gamma, X_i, X_j) \in \mathbb{Z}_q^*$
      $R_5 = H_5(t_w, x_i, X_i) \in \{0, 1\}^{I_5}$
      $R_6 = H_0(t_w)$
      Output the re-encryption key $RK_{i \to j} = (R_1, R_2, R_3, R_4, R_5, R_6)$
  Self-Encrypt(m, $t_w$, SKi, PKi, Params): On input of message m, tag tw, private key SKi, public key PKi of user Ui and the public parameters Params
    Choose random $\omega \in \mathbb{Z}_{q^*}$
    Set $h_t = H_1(t_w, x_i, X_i) \in \mathbb{Z}_{q^*}$
    Compute $C_1 = t + h_t$
    Compute Key = $H_2(t)$
    Compute $C_2 = \{\hat{C}_i\}_{(for\ i=1\ to\ l)}$ and $\hat{C}_i = $ Sym.Encrypt ($M_i$, Key) for all i=1 to l, l is the number of blocks. Assume that $m = M_1 M_2 \ldots M_l$ where $|M_i| = k$ and k is the block size of Δ.
    Set $C_3 = H_3(m, t)$
    Find $\alpha = H_5(t_w, x_i, X_i) \in (0,1)^{I_5}$
    $C_4 = H_4(C_1, C_2, C_3, \alpha, X)$
    Set $C_5 = H_0(t_w)$
    Output the ciphertext $C = (C_1, H_c(C_2), C_3, C_4, C_5)$.
  Re-Encrypt(C, $PK_i, PK_j, c_w, RK_{i \to j}$, Params): This algorithm is run by the proxy which is given with the re-encryption key $RK_{i \to j}$ by user $U_i$. This generates the re-encryption of a ciphertext encrypted under public key $PK_i$; of user $U_i$ under the condition $c_w$ into a ciphertext encrypted under public key $PK_j$ of user $U_j$. This algorithm does not perform any complex computation, and this greatly reduces the computational overhead on the entity that performs the role of a proxy. This algorithm does the following computations If $C_4 \neq H_4(C_1, H_c(C_2), C_3, R_5, t_w, X)$ OR $C_5 \neq R_6$, then it returns $\perp$ Set $D_2=C_2, D_3=C_3, D_4=R_2, D_5=R_3$ Choose $u \in \{0, 1\}^{I_u}$ Compute $\beta = H_9(u, R_4) \in \mathbb{Z}_{q^*}$ Compute $D_1 = \beta(C_1+R_1) \in \mathbb{Z}_{q^*}$ Set $D_6 = u$ Output the re-encrypted ciphertext $D=(D_1, D_2, D_3, D_4, D_5, D_6)$ Self-Decrypt(C, $SK_i$, Params): Self-Decrypt algorithm is used to decrypt the self-encrypted ciphertext C of a user that is stored by him in the cloud. This algorithm performs the following:

Find $a = H_5(t_w, x_i, X_i) \in \{0, 1\}^{I_5}$.

If $C_4 \neq H_4(C_1, C_2, C_3, \alpha, t_w, X)$, then it returns $\perp$ $h_t = H_1(t_w, SK_i)$.

$t = C_1 - h_t$

Key $= H_2(t)$

Compute $M_i = \text{Sym.Decrypt}(\hat{C}_i, \text{Key})$ for all $i=1$ to $l$ and construct $m = M_1 M_2 \ldots M_l$.

If $C_3 \stackrel{?}{=} H_3(m, t)$ then, output m. Else, Output $\perp$.

Correctness of t:

$$RHS = C_1 - h_t$$
$$= (t + h_t) - h_t$$
$$= t$$
$$= LHS$$

Re-Decrypt(D, $SK_j$, Params): The Re-Decrypt algorithm is used to decrypt the re-encrypted ciphertext D. This algorithm does the following:

Compute $\gamma = x_j D_4$

Compute $\omega \| D_5 \otimes H_8(\gamma, X_j)$

Compute $r = H_6(\omega, x_j X_i, X_i, X_j) \in \mathbb{Z}_{q^*}$

Compute $s = H_7(r, X_j) \in \mathbb{Z}$ $p = H_6(\omega, \gamma, X_i, X_j) \in \mathbb{Z}$ Compute $\beta = H_9(D_6, p) \in \mathbb{Z}$ Compute $t = \beta^{-1}(D_1) - s$ Find Key $= H_2(t)$ Compute $M_i = \text{Sym.Decrypt}(\hat{C}_i, \text{Key})$ for all $i=1$ to $l$ and construct $m = M_1 M_2 \ldots M_l$ If $(C3 \stackrel{?}{=} H_3(m, t))$ then, output m. Else, it returns $\perp$.

A similar Correctness algorithm can be applied, in one embodiment, for example, as described below:

Correctness of T:

$$RHS = \beta^{-1} D_1 - s$$
$$= \beta^{-1}[\beta(C_1 + R_1)] - s$$
$$= [(t + h_t) + (s - h_c)] - s: \text{Here } h_t = h_c$$
$$= (t + s) - s$$
$$= t$$
$$= LHS$$

The Security Proof of the SE-PRE model can be given as below. The original ciphertext and the transformed ciphertext security in the random oracle model are consistent.

Security of the Original Ciphertext

Theorem 2. If a $(\gamma, \epsilon)$ adversary A with an advantage $\epsilon$ breaks the IND-SE-PRE-CCA$_O$ security of the SE-PRE scheme in time $\gamma$, then C can solve the discrete log problem or CDH with advantage $\epsilon'$ where, $\epsilon' \geq (1/q_t) \epsilon$ Here, $q_t$ is the number of queries to $H_6$ oracle.

Proof: We formally prove the original ciphertext security IND-SE-PRE-CCA$_O$ of SE-PRE scheme in the random oracle model. The IND-SE-PRE-CCA$_O$ security of the SE-PRE scheme is reduced to the discrete algorithm problem (DLP) or the Computational Diffie Hellman Problem (CDH). The challenger is given with the instance of CDH q, P, Y=aP, Y$^I$=a$^2$P, Z=bP) such that q is a large prime, P, Y, Y', Z$\in$G. Now, we show that if there exists an adversary A that can break IND-SE-PRE-CCA$_O$ security of the SE-PRE scheme then C can make use of that adversary A to solve the discrete logarithm problem or the CDH problem, which are assumed to be hard. Hence the existence of such an adversary A is not possible. Now, adversary A is provided the access to various Self-Encrypt, Self-Decrypt, ReKey, Re-Encrypt, Re-Decrypt algorithms and the hash function as oracles. C provides $PK_T = Y$ AND $t_w^*$ to A. The game is demonstrated below.

Phase-1: A interacts with C adhering to the restrictions given in the security model IND-SE-PRE-CCA$_O$. A submits the target condition $t_w^*$ to C. C answers the queries made to various Corrupted KeyGen, Uncorrupted Keygen, Self-Encrypt, Self-Decrypt, Rekey, Re-Encrypt, Re-Decrypt oracles and the hash oracles as given below:

The hash functions are modelled as random oracles. In order to provide consistent out put, C maintains various lists $L_{Hc}$, and $L_{Hi}$, (for $i=0$ to $9$) corresponding to the hash function $H_c$ and $H_i$, (for $i=0$ to $9$). Oracles $H_1$, $H_2$ and $H_3$ are simulated as given in the proof of SE scheme. The other hash oracles are simulated as follows:

$H_0$ Oracle: On input of $t_w$, C checks whether a tuple ($t_w$, $h_0$) corresponding to $t_w$ is there in $L_{H_0}$ list. If it is already present then return $h_0$, else pick $h_0 \in \{0, 1\}^{I_0}$ Store ($t_w$, $h_0$) in $L_{H_0}$, list and return ho.

$H_c$ Oracle: On input of $\vec{C}$, C checks whether a tuple ($\vec{C}, h_c$) corresponding to $\vec{C}$ is already there in $L_{H_c}$ list. If it is present then $h_c$ is returned, else pick $h_c \in \{0, 1\}^{I_c}$ Store ($\vec{C}$, hc) in $L_{H_c}$, list and return $h_c$.

$H_1$ Oracle: When a query with input ($t_w$, x, X) is made, the tuple ($t_w$, x, X $h_t$) is retrieved from $LH_1$, and $h_t$ is returned, if (tw. 2, X) is already there in $LH_1$ list. Otherwise, C does the following:

If $X = X_i$, in $L_{Honest}$ and $\vec{x}_i Y = X$, then abort. This is because C obtains the solution to DLP i.e $\vec{x}_i^{-1} = a$.

Pick $h_t \in G$.

If $h_t$ is already present in $L_{H_1}$ list, go to previous step.

Store ($t_w$, x, X, $h_t$) in $L_{H_1}$ list and output $h_t$.

$H_4$ Oracle: When $H_4$ oracle is queried with ($C_1, C_2, C_3$, $\alpha, t_w$ as input, C retrieves the tuple ($C_1, C_2, C_3, C_4$, $t_w$, $h_4$) from $L_{H4}$ list and returns h4, if an entry corresponding to (C1, C2, C3, α, $t_w$) is already there in $L_{H4}$ list. Otherwise, C does the following:
   Pick $h_4 \in \mathbb{Z}_q^*$.
   If $h_4$ is already present in $L_{H4}$ list, go to previous step.
   Store (C1, C2, C3, α, $t_w$, $h_4$) in $L_{H4}$ list and return $h_4$.
$H_5$ Oracle: When $H_5$ oracle is queried with ($t_w$, x, X) as input, C retrieves the tuple ($t_w$, x, X, $h_5$) from $L_{H5}$ list and returns β, if an entry corresponding to ($t_w$, x, X) is already there in $L_{H5}$ list. Otherwise, C does the following:
   Pick $h_5 \in \mathbb{Z}_q^*$
   If $h_5$ is already present in $L_{H5}$ list, go to previous step.
   Store ($t_w$, x, X, $h_5$) in $L_{H5}$ list and return $h_5$.
$H_6$ Oracle: When $H_6$ oracle is queried with (ω, γ. X. Y) as input, C retrieves the tuple (ω, γ. X. Y, $h_6$) from $L_{H_6}$ list and returns $h_6$, if an entry corresponding to (ω, γ, X) is there in $L_{H_6}$ list. Otherwise, C does the following:
   Pick $h_6 \in \mathbb{Z}_{q*}$
   If $h_6$ is already present in $L_{H6}$ list, go to previous step.
   Store (ω, γ. X. Y, $h_6$) in $L_{H6}$ list and return $h_6$.
In one embodiment, $H_7$ Oracle, $H_8$ Oracle, $H_9$ Oracle can be described, for example, as below. A person of ordinary skill in the art would understand the results are consistent.
$H_7$ Oracle: When $H_7$ oracle is queried with (r, X) as input, C retrieves the tuple (r, X, $h_7$) from $L_{H7}$ list and returns $h_7$, if an entry corresponding to (r, X) is already there in $L_{H7}$ list. Otherwise, C does the following:
   Pick $h_7 \in \mathbb{Z}_q^*$
   If $h_7$ is already present in $L_{H_7}$ list, go to previous step.
   Store (r, X, $h_7$) in $L_{H_7}$ list and return $h_7$.
$H_8$ Oracle: When $H_8$ oracle is queried with (γ, X) as input, C retrieves the tuple (γ, X, $h_8$) from $L_{H_8}$ list and returns ha, if an entry corresponding to (γ, X) is already there in $L_{H_8}$ list. Otherwise, C does the following:
   Pick $h_8 \in \{0, 1\}^{I_w+I_p}$.
   If $h_8$ is already present in $L_{H_8}$ list, go to previous step.
   Store (γ, X, $h_8$) in $L_{H_8}$ list and return $h_8$.
$H_9$ Oracle: When $H_9$ oracle is queried with (u, r) as input, C retrieves the tuple (u, r, $h_9$) from $L_{H_9}$ list and returns $h_9$, if an entry corresponding to (u, r) is already there in $L_{H_9}$ list. Otherwise, C does the following:
   Pick $h_9 \in \mathbb{Z}_q^*$
   If $h_9$ is already present in $L_{H_9}$ list, go to previous step.
   Store (u, r, $h_9$) in $L_{H_9}$ list and return $h_9$.
Corrupted KeyGen Oracle: When a query is made with input $U_i$, the C performs the following:
   Picks a random $x_i \in \mathbb{Z}_q^*$
   Computes $X_i = x_i P$
   Sets $PK_i = (X_i)$ and $SK_i = (x_i)$.
   Stores ($U_i$, $x_i$, $X_i$) in $L_{corrupt}$ list and returns ($SK_i$, $PK_i$). Here C knows the private key $SK_i$ of user $U_i$.
Uncorrupted Keygen Oracle: When a query is made with input $U_i$, the C performs the following:
   Picks a random $\bar{x}_i \in \mathbb{Z}_q^*$
   Computes $X_i = \bar{x}_i Y = \bar{x}_i aP = \bar{x}_i P$, where $x_i = \bar{x}_i a$
   Sets $PK_i = (X_i)$. By definition $SK_i = (x_i = \bar{x}_i a)$. This is not known to C; a is the the discrete log corresponding to Y in the DLP which is given as the challenge to C.
   Stores ($U_i$, -, $\bar{x}_i$, $X_i$) in $L_{Honest}$ list and returns $PK_i$.
RekeyGen Oracle, in one embodiment, can be described as follows. On input of ($c_w$, $PK_i$, $PKj$), C does the following to generate the re-encryption key.
   If ($PK_i \in L_{corrupt}$)
   Compute $RK_{i \to j}$=RekeyGen($c_w$, $SK_i$, $PK_j$).
   Store ($t_w$, $PK_i$, $PK_j$, $RK_{i \to j}$) in $L_{ReKey}$ list.

Output $RK_{i \to j}$
If $t_w$, $PK_i$, $PK_j$ has an entry in $L_{Rekey}$ list, retrieve and return $RK_{i \to j}$
If $PK_i \in L_{Honest}$, then
Choose $$\omega \xleftarrow{R} \in \{0, 1\}^{l_\omega}$$

Choose $h_c$ in $\mathbb{Z} \in_q^*$ and store ($C_w$, -, $X_i$) in $L_{H1}$ list.
If $X_j$ is corrupt $r = H_6(\omega, \bar{x}_i x_j aP, X_i, X_j) \mathbb{Z} \in_q^*$
If $t_w = t_w^*$ and $PK_i = PK_T$ then set $rb = H_6(\omega, \bar{x}_i a^2 P, X_i, X_j)\mathbb{Z} \in_q^*$ (Here C does not know rb)
Compute $s = H_7(-, X_j)\mathbb{Z} \in_q^*$
By definition $\gamma = rX_j; = r\bar{x}_j abP$
Compute the re-encryption key $RK_{i \to j} = (R_1, R_2, R_3, R_4, R_5, R_6)$ where,
   $R_1 = s - h_c \mathbb{Z} \in_q^*$
   $R_2 = rbP \mathbb{Z} G$
   $R_3 = (\omega \| X_i) \oplus H_8(-, X_j) \in \{0, 1\}^{I_w+I_g}$
   $R_4 = H_6(\omega, -, X_i, X_j) \in \mathbb{Z}$
   $R_5 = h_5 \in \{0, 1\}^{I_5}$, Store($t_w$, -, $X_i$, $h_5$) in $L_{H_5}$ list
   $R_6 = H_0(t_w)$
Output the re-encryption key $RK_{i \to j} = (R_1, R_2, R_3, R_4, R_5, R_6)$
Self-Encrypt Oracle: On input of (m, $t_w$, $PK_i$), C does the following:
   if $PK_i$ corrupt, then run Self-Encrypt(m, $t_w$, $SK_i$, $PK_i$)
   If $PK_i$ is honest, then perform the following
      Choose random $t \in \mathbb{Z}$
      Choose $h_t \in \mathbb{Z}_q^*$ and store ($t_w$, -$X_i$, $h_t$) in $L_{H_1}$ list.
      Compute $C_1 = t + h_t$.
      Compute Key=$H_2(t)$
      Compute $C2 = \{\hat{C}_i\}$ (for i=1 to l) and $\hat{C}_i$=Sym.Encrypt ($M_i$, Key) for all i=1 to l, l is the number of blocks. Assume that m=$M_1 M_2 \ldots M_i$ where $|M_i|$=k and k is the block size of Δ.
      Set $C_3 = H_3$(m, t).
      Choose $\alpha \in \{0,1\}^{I_5}$ and store ($t_w$, $x_i$, $X_i$, $h_5 = \alpha$) in $L_{H_5}$ list.
      $C_4 = H_4(C_1, C_2, C_3, \alpha, X)$
      Set $C_5 = H_0(t_w)$
      Store (C, $t_w$, $PK_i$) in $L_{Encrypt}$ list.
      Output the ciphertext $C = (C_1, H_c(C_2), C_3, C_4, C_5)$).
Re-Encrypt Oracle: On input $C = (C_1, C_2, C_3, C_4, C_5, PK_i, PK_j)$,
C does the following:
Generate the re-encryption key RK; =ReKey($PK_i$, $PK_j$;)
Run D=Re-Encrypt(C, $RK_{i \to j}$, $PK_i$, $PK_j$) as per the algorithm
Store (C, D, $PK_i$, $PK_j$, $t_w$) in $L_{Re-Encrypt}$ list and output D
Self-Decrypt Oracle: On input $C = (C_1, C_2, C_3, C_4, C_5, t_w, PK_i)$, C does the following:
If an entry for (C, $t_w$, $X_i$) is there in $L_{Encrypt}$ list return the corresponding m.
if $PK_i$ corrupt, then run Self-Decrypt(C, $SK_i$)
If $PK_i$ is honest, then perform the following:
   Find ($t_w$, x, X, $h_5$) from $L_{H_5}$ list such that ($X_i = xP$) OR ($X = X_i$, AND $x = -$). Set $\alpha = h_5$. If there is no such entry then query $\alpha = H_5(t_w, -, X_i)$.
   If $C_4 \neq H_4(C_1, C_2, C_3, \alpha, t_w, X)$, then it returns ⊥ Find ($t_w$, x, X, $h_1$) from $L_{H_1}$ list such that ($X_i = xP$) OR ($X = X_i$, AND $x = -$). Set $\alpha = h_5$. If there is no such entry query $\alpha = H_5(t_w, -, X_i)$.

Find ($t_w$, x, X, $h_1$) from $L_{H_1}$ list such that ($X_i$=xP) OR (X=$X_i$ AND x=–), then set $h_t$=$h_1$. If there is no such entry query then $h_t$=$H_1$($t_w$, $X_i$).

$t=C_1-h_t$

Key=H2(t)

Compute $M_i$=Sym.Decrypt($\hat{C}_i$, Key) for all i=1 to l and construct m=$M_1$ $M_2$ . . . $M_l$.

If $C_3 \stackrel{?}{=} H_3$(m, t) then, output m. Else, Output ⊥

Re-Decrypt Oracle: On input D=($D_1$, $D_2$, $D_3$, $D_4$, $D_5$, $t_w$, $PK_j$), C does the following:

if $PK_j$ corrupt, then run Re-Decrypt(D, $SK_j$)

If $PK_i$ and $PK_j$ are honest, then perform the following
1. Pick γ, $h_8$ from (γ, X, $h_8$) $L_{H_8}$ list for X=$X_j$ and
2. For each γ retrieved from $L_{H_8}$ list: compute ω‖$X_i$=$D_5$ ⊕ $h_8$ and r=$H_6$(ω, $\vec{x}_j$-$\vec{x}_i$-$a^2$P, $X_i$, $X_j$). If γ=r$X_j$, then proceed with next step, else continue checking with other γ retrieved from $L_{H8}$ list. If no such γ is found, then it returns ⊥
3. Compute s=$H_7$ (r, X)∈ $\mathbb{Z}_{q^*}$
4. p=$H_6$(ω, γ, $X_1$, $X_j$)∈ $\mathbb{Z}$
5. Compute β=$H_9$(D6, p)∈ $\mathbb{Z}$
6. Compute $t=\beta^{-1}(D_1)-s$
7. Find Key=$H_2$(t)
8. Compute $M_i$=Sym.Decrypt($\hat{C}_i$, Key) for all i=1 to; and construct m=$M_1$ $M_2$ . . . $M_l$.

9. If (C3 $\stackrel{?}{=}$ $H_3$ (m, t)) then, output m. Else, it returns ⊥.

Challenge Phase: Once the training is over, A provides $m_0$, $m_l \in M$ such that ($m_0$, $t_w$*) or ($m_1$, $t_w$*) was not queried to Self-Encrypt oracle during Phase-1 and provides to C. C generates the challenge ciphertext C*=Self-Encrypt($m_δ$, $t_w$*) and δ∈R {0, 1}

Phase-2 and Guess algorithms, can be described as follows, for example, in one embodiment.

Phase-2: A can interact with the oracles provided in Phase-1 with the following restrictions, A cannot make the query Self-Decrypt(C*)

A cannot make the query Self-Encrypt($m_δ$, $t_w$*), δ∈ {0, 1}

A cannot make the query Re-Encrypt(C*, $PK_T$, $PK_j$), $PK_j \in L_{corrupt}$

A cannot make the query Re-Decrypt(D, $PK_j$), if D=Re-Encrypt(C*, $PK_T$, $PK_j$) and $PK_j \in L_{Honest}$ A cannot make the query ReKey($t_w$*, $PK_T$, $PK_j$) and $PK_j \in L_{corrupt}$ Guess: After getting sufficient training, A output the guess δ'. A wins the game if δ=δ' C now picks randomly γ from $L_{H_6}$ list and provides as solution to the CDH problem.

Security of the Transformed Ciphertext

Theorem 3. If a (t. €) adversary A with an advantage € breaks the IND-SE-PRE-CCA$_T$ security of the SE-PRE scheme, then C can solve the Computational Diffie Hellman (CDH) problem with advantage €' where, €'(1/$q_t$)€

Here, $q_t$ is the number of queries to $H_6$ oracle.

Proof In this section we formally prove the security of the transformed ciphertext of SE-PRE scheme in the random oracle model. The security of the scheme is reduced to the CDH problem. The challenger A is given the instance of CDH (i.e given (q, P, aP, bP) such that q is a large prime, P, aP, bP∈ $\mathbb{G}$, find Y such that Y=abP.) Now, if there exist an adversary who can break the IND-SE-PRE-CCA$_T$ security of SE-PRE then C can make use of A to solve the CDH problem, which is assumed to be hard. Hence such an A does not exist.

All the oracles are similar to that of IND-SE-PRE-CCA$_O$. The challenge ciphertext issued will be a transformed ciphertext. A has much more access than IND-SE-PRE-CCA$_O$:

A is allowed to access the rekey from $PK_T$ to any $PK_j$.

A is allowed to access Self-Decrypt for $PK_T$

Challenge: After getting sufficient training A provides two messages $m_0$, $m_1$ and gives to C. C generates the ciphertext as, Generate C*=Self-Encrypt($m_δ$, $t_w$*, $PK_i$); $PK_i \in L_{Honest}$ Generate D*=RE-Encrypt(C*, $t_w$*, $PK_i$, $PK_T$);

Provides D* to A.

In Phase-2, A is now allowed to access all the oracles except Re-Decrypt(D*, $PK_T$). The rest of the proof is similar to IND-SE-PRE-CCA$_O$.

Experimental Analysis provides the implementation results and time taken by various algorithms in SE and SE-PRE scheme. We compare the efficiency of our CCA secure SE scheme with the traditional CPA secure El-Gamal scheme (Weaker security than CCA) and report the same in FIG. 2 Table. 1. Also, we have compared our SE-PRE scheme with the only non-pairing unidirectional CCA secure PRE scheme by others available. This is reported in FIG. 2 Table. 2. It is a known fact that pairing is very expensive than other group operations and hence we are not taking any pairing based schemes into consideration. The implementations are done on 2.4 GHz Intel Core i7 quad-core processor and the results have been reported below. The programming language used is Go language, and the programming tool is Goland 2018.2. The cryptographic protocols are implemented using the edwards25519-curve, which is the current standard deployed in cryptocurrencies for fast performances. From the performance comparison in FIG. 2 Table 1, we note that our CCA secure self-encryption SE scheme is more efficient than the existing CPA-secure El-Gamal encryption scheme. Also, from FIG. 2 Table 2, it is evident that our self-proxy re-encryption SE-PRE scheme without bilinear pairing is more efficient than the existing pairing-free PRE scheme by others.

From the above results it is evident that our SE encryption scheme is practical and suitable for cloud based scenarios where the user themselves store their files. Also, the SE-PRE scheme provides a very efficient approach to share encrypted files mainly in block-chain.

We have given a self encryption scheme SE based on discrete logarithm (DLP) assumption and then extended it to a Proxy Re-Encryption(SE-PRE) scheme suitable for block-chain and distributed storage. First, we formally prove the CCA security of the SE and then the security of SE-PRE scheme in the random oracle model. We have also implemented our SE-PRE scheme using GO language. From the results of our implementation, it is evident that our SE-PRE scheme is much efficient than the techniques available in literature and industry till date. This makes it more suitable for distributed applications. A person of ordinary skill in the art would understand that one can design a multi-recipient or broadcast PRE based on the self encryption approach that will provide high efficiency gain in decentralized platforms.

Figure 3:
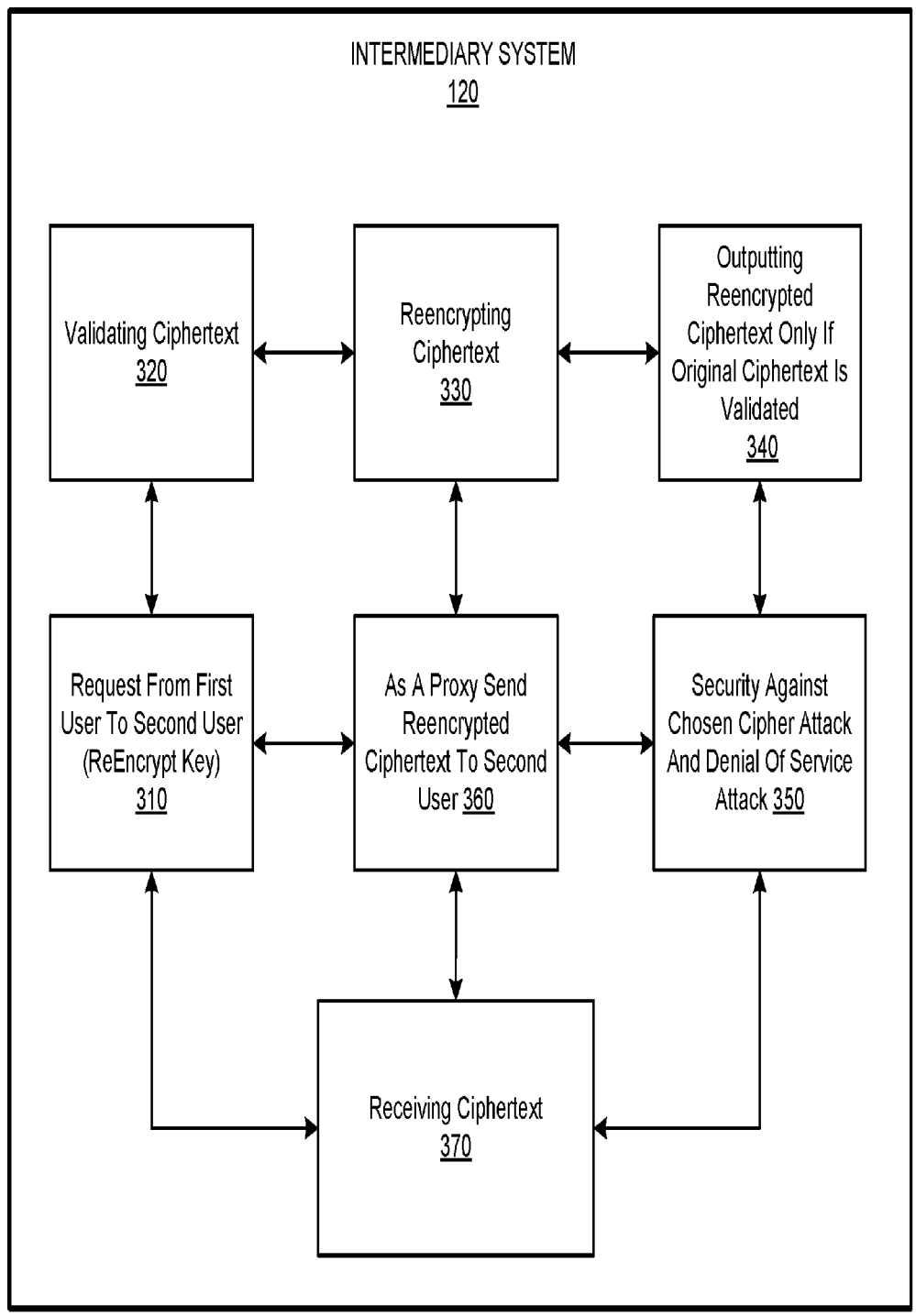
FIG. 3 is an exploded view of an intermediary computing system illustrating different modules and functions, according to one embodiment.

FIG. 3 is an exploded view of an intermediary system 120 in FIG. 1 according to one embodiment disclosing self-encryption in proxy re-encrypt scheme. Different modules within the intermediary system that operate according to the disclosures herein are described. For example, module 370 receives ciphertext from one or more clients. Module 310 process the received ciphertext and extracts the sender, i.e. the first user. Module 310 further extracts the second user to whom the request is supposed to be re-sent. Module 320 validates that the ciphertext originated from first user. If the ciphertext is not validated, it is discarded immediately and no further action is taken on that ciphertext. If the ciphertext is not validated, error correcting mechanisms may be employed to check whether the ciphertext is corrupt because of network connection failure or an attack by an intruder. Module 330 re-encrypts the ciphertext based on the re-encryption key created by first user using second user's public key. Module 340, outputs the re-encrypted ciphertext only if original ciphertext was validated. Module 350 provides security against chosen cipher attack and denial of service attack. Module 360 as a proxy sends the reencrypted ciphertext to the second user.

II. Secure Content Access Audit with Blockchain

We provide a fast finality blockchain with cost effective solution that allows for independent verifiable audit capability along with providing end to end security for content from authoring to distribution.

Figure 4:
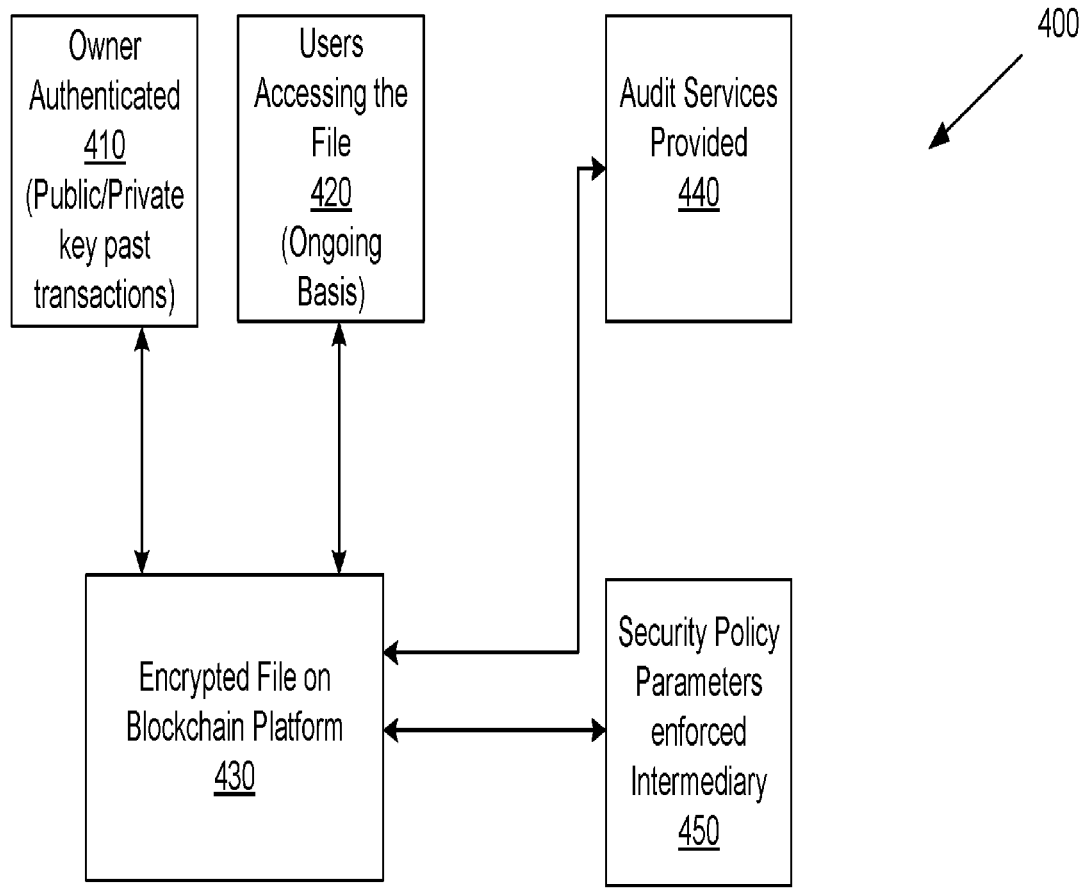
FIG. 4 discloses an encrypted file access with independent audit service provider work flow illustrating different modules and functions, according to one embodiment.

FIG. 4 discloses a data workflow 400 for an encrypted file that requires independent audit response. For example, encrypted file 430 is put on the blockchain platform by an authenticated owner 410. In one embodiment, the owner 410 is authenticated using proof of past public/private key transactions on the blockchain platform. In one embodiment, the owner 410 is authenticated using split-keys on two or more owner devices. In one embodiment, the owner 410 is authenticated using a combination of single signature on and split-key authentication techniques. Different users and clients 420 can access the encrypted file 430 on an ongoing basis according to security policy parameters set by owner. The security policy parameters for the encrypted file 430 are enforced by an intermediary 450. Another intermediary 440 can provide audit services for the encrypted file.

Figure 5:
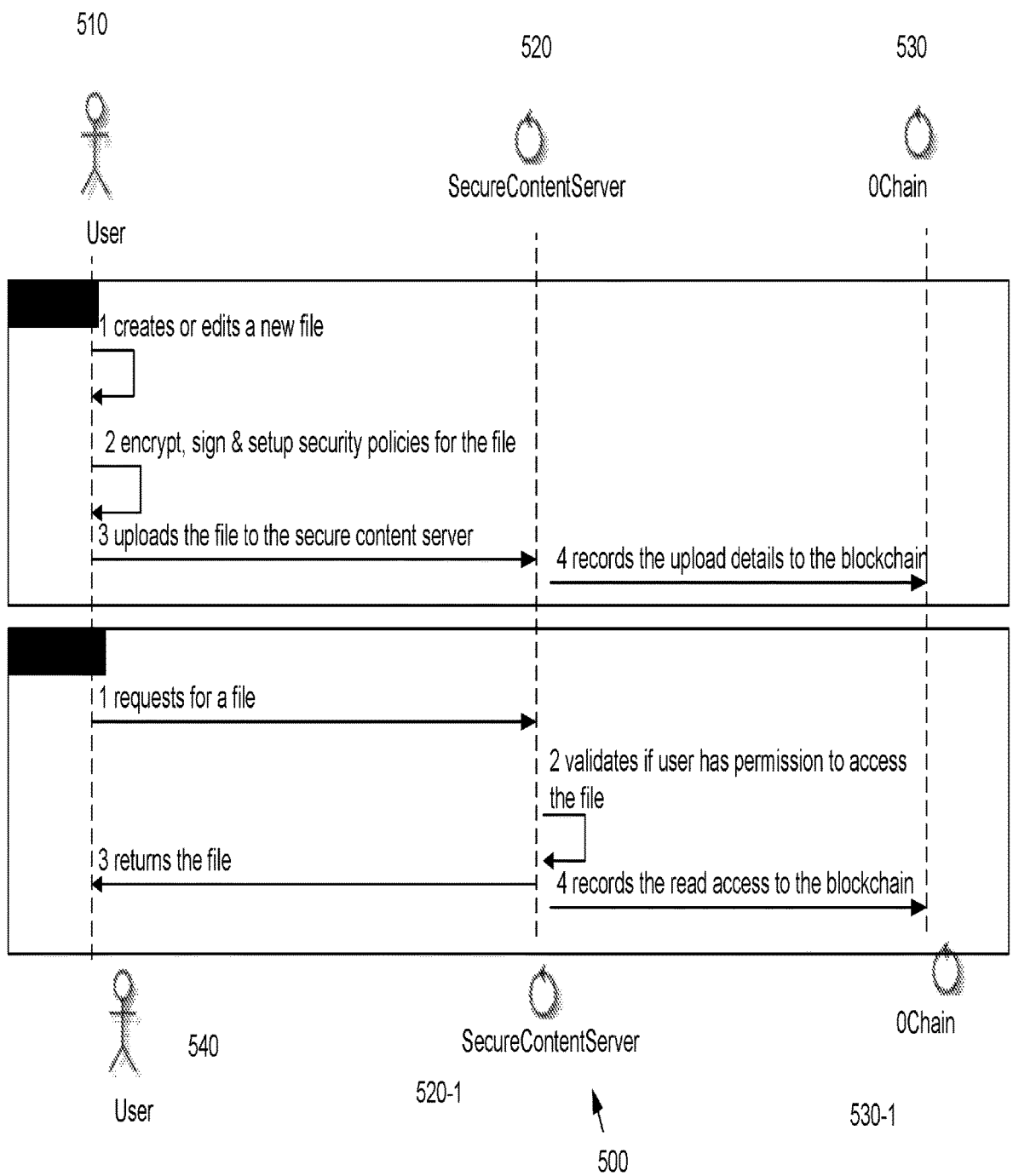
FIG. 5 discloses messaging work flow to access an encrypted file and audit reporting on a blockchain platform with server-side integration, according to one embodiment.

FIG. 5 is integration at the server level. The idea here is that the end users will not have any changes to their workflows. Everything is taken care of at the server level. Whenever a user submits data or reads data, it is automatically recorded on the blockchain by the server. This level of integration provides tamperproof auditability with accurate timestamp information. It is assumed that the server is trusted at any given moment to submit the right data to the blockchain but will not be able to alter it later on.

Figure 6:
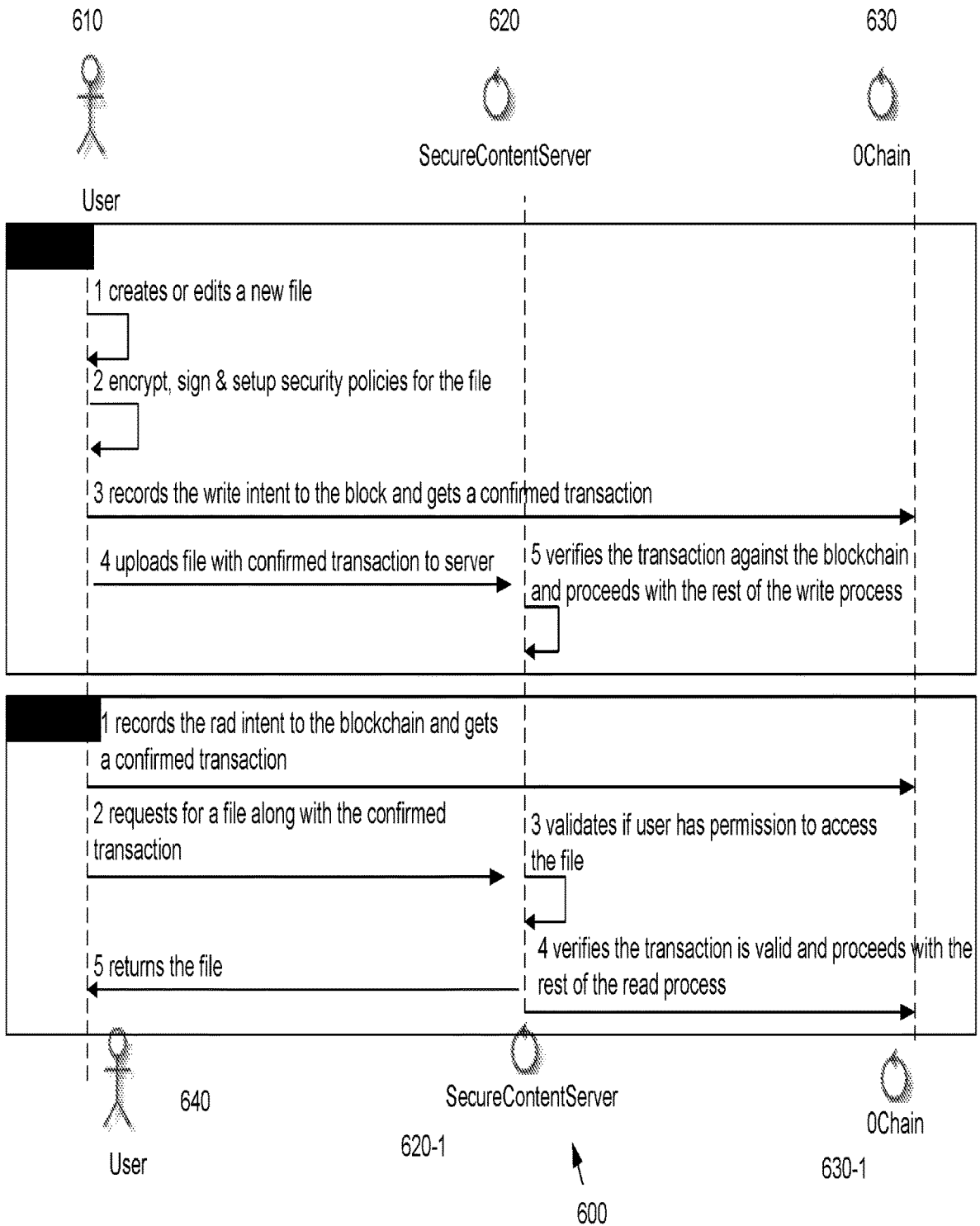
FIG. 6 discloses messaging work flow to access an encrypted file and audit reporting on a blockchain platform with server and client-side integration, according to one embodiment.

FIG. 6 shows integration at the server and client level. There may be cases where even the server can't be trusted. Or the enterprise wants the audit data to be provided by the client instead of the server. In this case, it is expected that each user has credentials with the blockchain and use those credentials to submit their read/write transactions and then present that as a proof to the server to access the content. The server can continue to enforce access control and even record any access that is not permitted presenting the transaction presented by the user to read the content.

In one embodiment, there is integration at the storage level for enterprises. There are cases where the enterprise prefers to have a zero-knowledge storage system. In this model, the storage of the data is done in a decentralized manner by storage providers and each has access to only a partial content that is also further secured via encryption. The end user controls the keys to the content and distribute it to users of their choice via proxy re-encryption keys.

Figure 7:
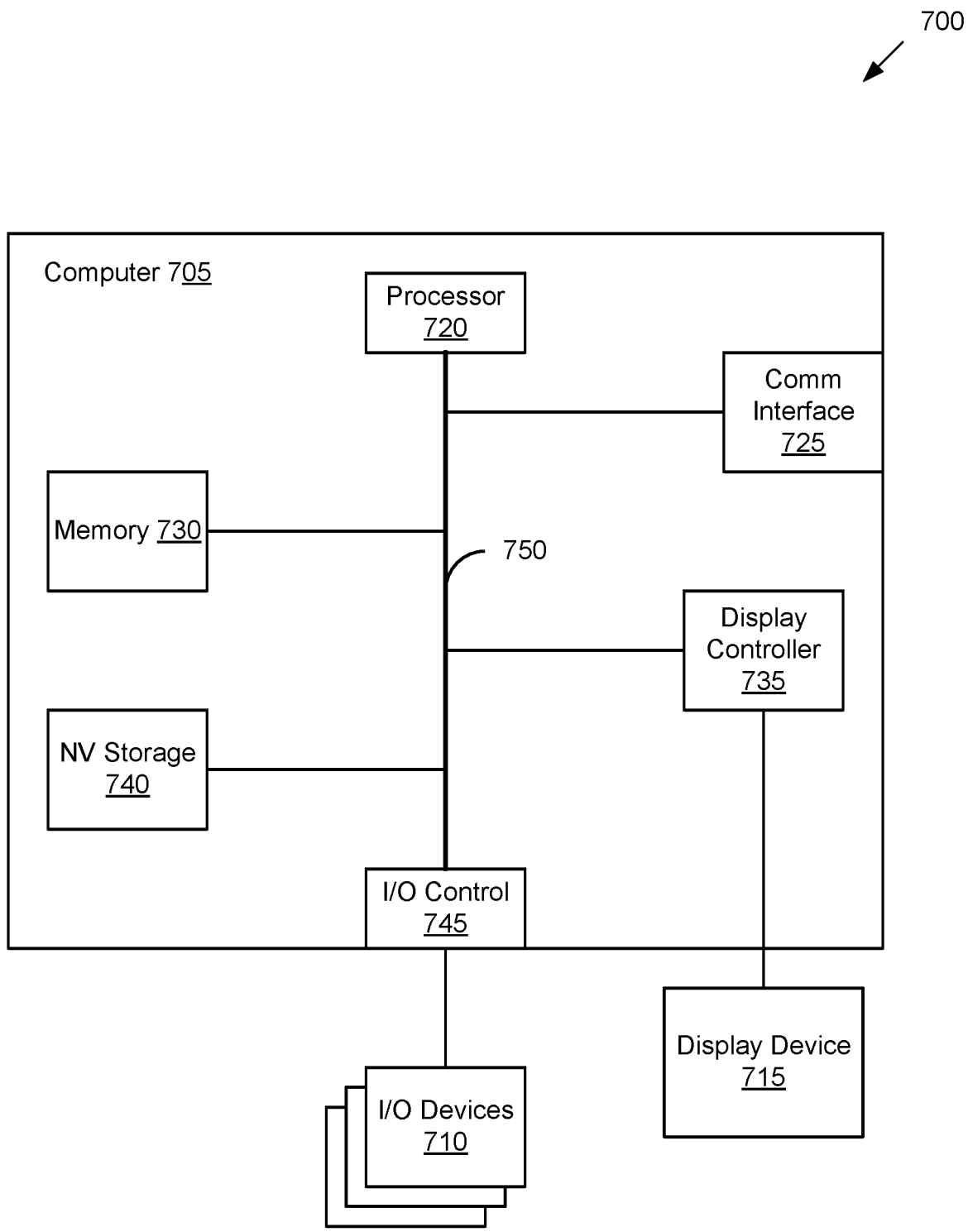
FIG. 7 is a schematic diagram of exemplary computing devices that can be used to implement the methods and systems disclosed herein, according to one embodiment.

FIG. 7 is a schematic diagram of computing device 700 that can be used to implement the methods and systems disclosed herein, according to one or more embodiments. FIG. 7 is a schematic of a computing device 700 that can be used to perform and/or implement any of the embodiments disclosed herein. In one or more embodiments, client system 110, an intermediary system 120, service provider system 130 of FIG. 1 may be the computing device 700.

The computing device 700 may represent various forms of digital computers, such as laptops, desktops, workstations, personal digital assistants, servers, blade servers, mainframes, and/or other appropriate computers. The computing device 700 may represent various forms of mobile devices, such as smartphones, camera phones, personal digital assistants, cellular telephones, and other similar mobile devices. The components shown here, their connections, couples, and relationships, and their functions, are meant to be exemplary only, and are not meant to limit the embodiments described and/or claimed.

FIG. 7 shows an example of a computing device 700 on which techniques described here can be implemented. The computing device 700 can be a conventional computer system that can be used as a client computer system, such as a wireless client or a workstation, or a server computer system. The computing device 700 includes a computer 705, I/O devices 710, and a display device 715. The computer 705 includes a processor 720, a communications interface 725, memory 730, display controller 735, non-volatile storage 740, and I/O controller 745. The computer 705 may be coupled to or include the I/O devices 710 and display device 715.

The computer 705 interfaces to external systems through the communications interface 725, which may include a modem or network interface. It will be appreciated that the communications interface 725 can be considered to be part of the computing device 700 or a part of the computer 705. The communications interface 725 can be an analog modem, integrated services for digital networks ("ISDN") modem, cable modem, token ring interface, satellite transmission interface (e.g. "direct personal computer" also known as "direct PC"), or other interfaces for coupling a computer system to other computer systems.

The processor 720 may be, for example, a conventional microprocessor such as an Intel Pentium microprocessor or Motorola power PC microprocessor. The memory 730 is coupled to the processor 720 by a bus 750. The memory 730 can be Dynamic Random Access Memory (DRAM) and can also include Static RAM (SRAM). The bus 750 couples the processor 720 to the memory 730, also to the non-volatile storage 740, to the display controller 735, and to the I/O controller 745.

The I/O devices 710 can include a keyboard, disk drives, printers, a scanner, and other input and output devices, including a mouse or other pointing device. The display controller 735 may control in the conventional manner a display on the display device 715, which can be, for example, a cathode ray tube (CRT) or liquid crystal display (LCD). The display controller 735 and the I/O controller 745 can be implemented with conventional well-known technology.

The non-volatile storage 740 is often a magnetic hard disk, an optical disk, or another form of storage for large amounts of data. Some of this data is often written, by a direct memory access process, into memory 730 during execution of software in the computer 705. One of skill in the art will immediately recognize that the terms "machine-readable medium" or "computer-readable medium" includes any type of storage device that is accessible by the processor 720 and also encompasses a carrier wave that encodes a data signal.

The computing device 700 is one example of many possible computer systems that have different architectures. For example, personal computers based on an Intel microprocessor often have multiple buses, one of which can be an I/O bus for the peripherals and one that directly connects the processor 720 and the memory 730 (often referred to as a memory bus). The buses are connected together through bridge components that perform any necessary translation due to differing bus protocols.

Network computers are another type of computer system that can be used in conjunction with the teachings described here. Network computers do not usually include a hard disk or other mass storage, and the executable programs are loaded from a network connection into the memory 730 for execution by the processor 720. A Web TV system, which is known in the art, is also considered to be a computer system, but it may lack some of the components shown in FIG. 7, such as certain input or output devices. A typical computer system will usually include at least a processor, memory, and a bus coupling the memory to the processor.

Though FIG. 7 shows an example of the computing device 700, it is noted that the term "computer system," as used here, is intended to be construed broadly. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller. An example of a computer system is shown in FIG. 7.

The memory can include, by way of example but not limitation, random access memory (RAM), such as dynamic RAM (DRAM) and static RAM (SRAM). The memory can be local, remote, or distributed. As used here, the term "computer-readable storage medium" is intended to include only physical media, such as memory. As used here, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The bus can also couple the processor to the non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory here. Even when software is moved to the memory for execution, the processor will typically make use of hardware registers to store values associated with the software, and local cache that, ideally, serves to speed up execution. As used here, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. Interfaces enable computer systems and other devices to be coupled together in a network.

Several components described here, including clients, servers, and engines, can be compatible with or implemented using a cloud-based computing system. As used here, a cloud-based computing system is a system that provides computing resources, software, and/or information to client systems by maintaining centralized services and resources that the client systems can access over a communications interface, such as a network. The cloud-based computing system can involve a subscription for services or use a utility pricing model. Users can access the protocols of the cloud-based computing system through a web browser or other container application located on their client system.

The invention disclosure describes techniques that those of skill in the art can implement in numerous ways. For instance, those of skill in the art can implement the techniques described here using a process, an apparatus, a system, a composition of matter, a computer program product embodied on a computer-readable storage medium, and/or a processor, such as a processor configured to execute instructions stored on and/or provided by a memory coupled to the processor. Unless stated otherwise, a component such as a processor or a memory described as being configured to perform a task may be implemented as a general component that is configured to perform the task at a given time or a specific component that is manufactured to perform the task. As used here, the term 'processor' refers to one or more devices, circuits, and/or processing cores configured to process data, such as computer program instructions.

A detailed description of one or more implementations of the invention is provided here along with accompanying figures that illustrate the principles of the invention. The invention is described in connection with such implementations, but the invention is not limited to any implementation. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Techniques described here relate to apparatus for performing the operations. The apparatus can be specially constructed for the required purposes, or it can comprise a general-purpose computer selectively activated or reconfigured by a computer program stored in the computer. Such a computer program may be stored in a computer-readable storage medium, such as, but is not limited to, read-only memories (ROMs), random access memories (RAMs), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus. Although the foregoing implementations have been described in some detail for purposes of clarity of understanding, implementations are not necessarily limited to the details provided.

III. Multiple Signatures on a Smart Wallet

In one embodiment, a smart wallet is made of Modern Portfolio Theory (MPT) wallet. Users can add T-of-N multi-sig capabilities to standard MPT wallets. Votes to send tokens must arrive one-per-transaction and are stored in public blockchain state. A group signature on a description of transfer is recovered from the votes. Validation of the signature happens outside of the smart contract. State may be pruned safely, allowing amnesiac property of miners is preserved without loss of security.

In one embodiment, a single, shared smart contract collects votes for proposals to send tokens between wallets. In one embodiment, the wallet associated with the smart contract is not used and multiple-signatures ("multi-sig") are sent directly on standard modern portfolio theory ("MPT") based wallets. This removes the support for non-token-transfer operations guarded by a multi-sig, meaning in one embodiment, this design will not support data transactions or arbitrary smart contract calls. The policy of multi-sig is enforced automatically. In one embodiment, threshold cryptography will be utilized to create signatures for the exchange/corporate MPT wallet. In one embodiment, Shamir's secret sharing is used as a simple way to create keys capable of this feature. New transactions will not be dynamically created inside the smart contract.

The benefits of implementing multiple signatures on a smart wallet include creation of multi-signature wallets, voting for transfers and pruning of old proposed transfers and votes. Any implementation has to consider the following before finalizing transactions on the smart wallet: querying whether multi-signature capabilities already exist; updating the list of signers and/or required number of votes; deletion of multi-signature capabilities for a wallet.

Allow creation of a multiple signature wallet context for a wallet. The transaction containing this request must be send from the target wallet's client. It must include a list of voter public keys and the minimum number of votes that must be collected before funds may be sent from the wallet. If a wallet with this multi-sig wallet context already exists, it is an error. Don't disallow normal TxnTypeSend from a wallet for which a multi-sig wallet context exists. Allow creation of multi-sig transfer votes for a wallet. The votes must contain a proposal ID value to differentiate between multiple transfers of the same value to the same client. Different multi-sig wallet contexts may have proposals with the same ID. When a vote is sent with an ID not currently in the database, a proposal object is created in state. A vote must contain an inner signature produced by the vote's sender. This signature is on a message similar to the following:

${FromWalletID}:${ToWalletID}:${Value}

Add chaincore/chain/state_context.go#AddSignedTransfer( ) call that is similar to AddTransfer( ) but which also takes a signature and may send from any wallet. This AddSignedTransfer call reconstructs the message above and validates the passed signature against it and from the wallet's public key. If the signature is invalid, the call fails and the transfer is rejected.

When the required number of votes are collected on a multi-sig send proposal, it is executed. If the wallet does not have enough balance to complete the transaction, the vote transaction succeeds (so as to eligible to be included in a block) but does not count the vote toward the proposal and a transaction output message that there aren't enough funds. Because the vote is not counted, it allows the last voter to try again later. If the transfer succeeds, the proposal object that was allocated for this transfer is not deleted yet. This allows us to tell additional votes that come in soon after that their proposal was already executed.

Multi-sig proposals are assigned an expiration date by the smart contract. When the expiration date is past, a proposal is eligible for deletion.

When a vote comes in, the blockchain checks the oldest proposal it knows of (across all multi-sig wallets, not just the one being voted on) to see if it is expired. If so, it is deleted ("pruned") and the ID value that the proposal held is free to be re-used by the originating multi-sig wallet. Only one proposal may be deleted per incoming vote to protect against any single vote transaction performing a large amount of IO. This will help to future-proof this multi-sig wallet scheme from any IO quota policy the blockchain might decide to one day start implementing.

If a vote comes in for a proposal that is past expiry but which has not been pruned yet, the proposal is immediately deleted ("pruned") and a new proposal with the same ID is instantiated. This presents a consistent behavior between an expired-deleted and an expired-not-yet-deleted proposal.

Figure 8:
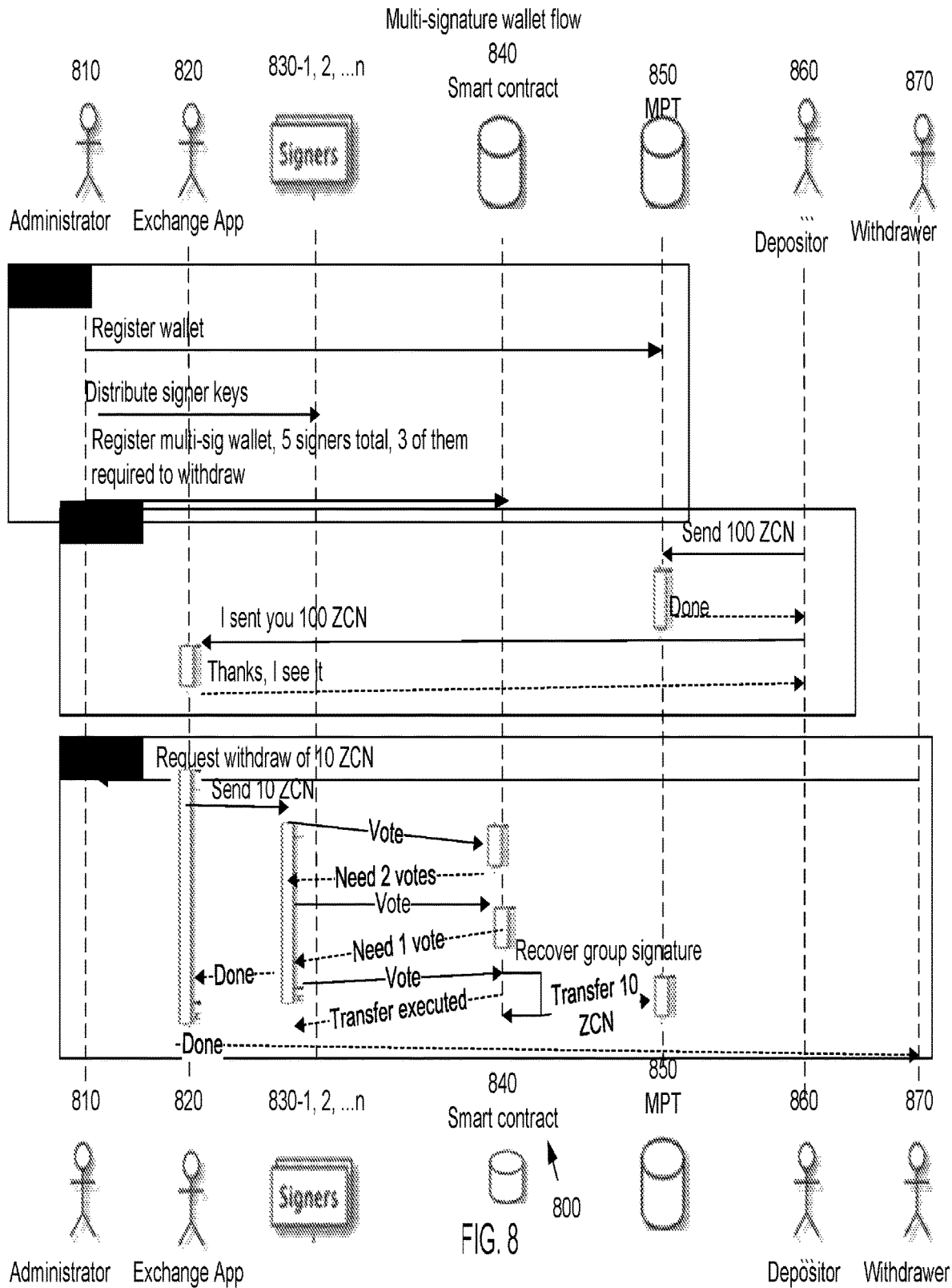
FIG. 8 discloses messaging flow for multiple signatures smart contract implementation, according to one embodiment.

FIG. 8 shows 800 multiple-signature wallet flow for messages between different entities. At 810 is Administrator of the blockchain, 820 is the Exchange application for transactions, 830-1,2,3, . . . n are different multiple signers, 840 is the smart contract, 850 is modern portfolio theory wallet, 860 is the depositor and 870 is the withdrawer. The figure shows register, deposit and withdraw events and corresponding messages according to one embodiment.

Figure 9:
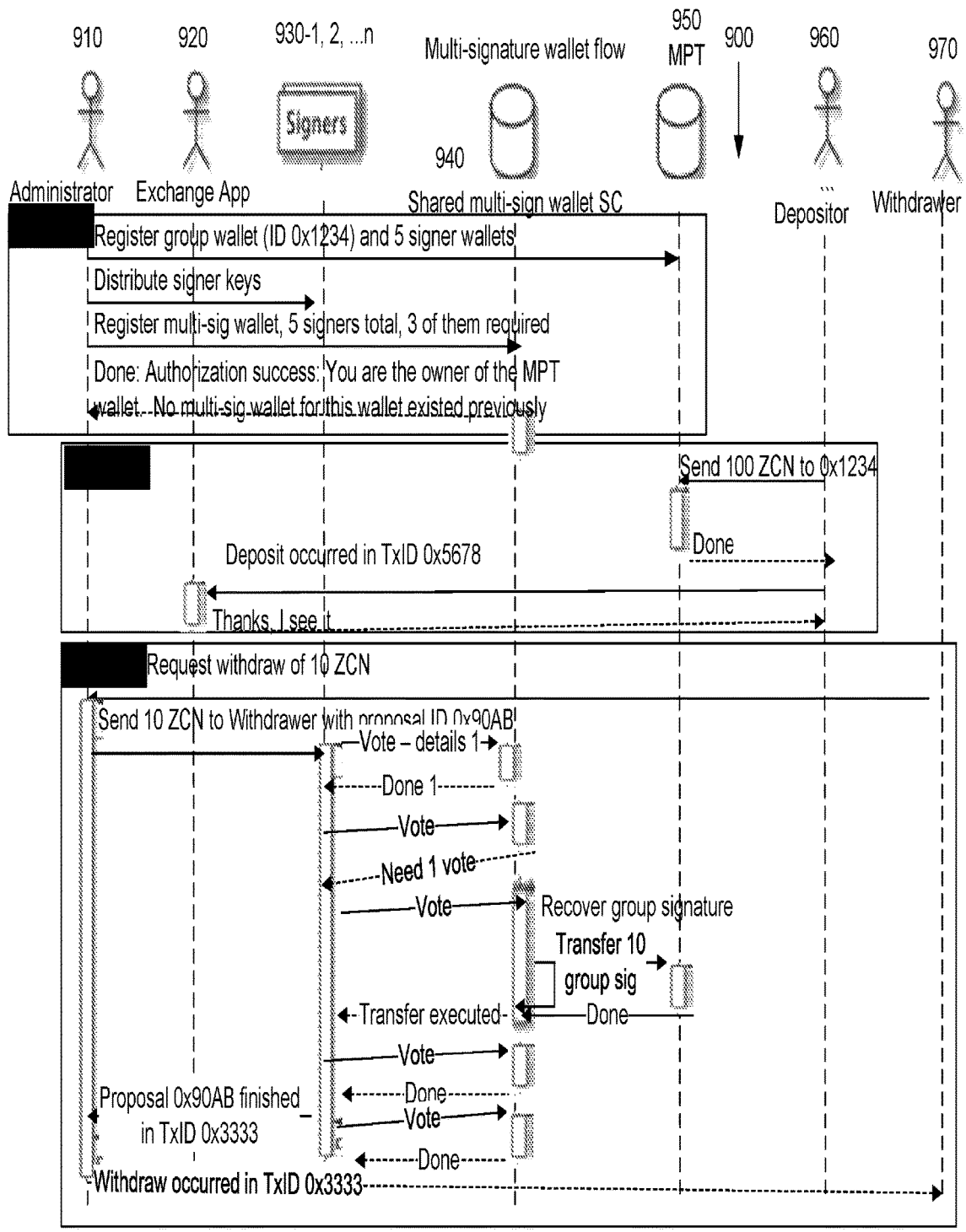
FIG. 9 discloses messaging flow for multiple signatures smart wallet implementation, according to one embodiment.

FIG. 9 shows 900 multiple-signature wallet flow for messages between different entities in one embodiment. At 910 is the Administrator, 920 is the Exchange application, Signers are at 930-1,2,3, . . . n, 940 is the shared multiple-signature wallet associated with a smart contract, 950 is the modern portfolio theory wallet, 960 is the depositor, and 970 is the withdrawer. The figure shows register, deposit and withdraw events and corresponding messages according to one embodiment.

IV. Split Key Authentication and Password-Less Login

Blockchain platform with a novel split-key1 mechanism is used to provide more secure authentication and password-less login. Interestingly the same scheme can also be used in an enterprise SSO setting by replacing the traditional password based login with a more secure authentication using only digital keys and just using the laptop/desktop and mobile app and no special hardware.

The value proposition for this approach is a higher security and an easier password-less login flow, without the need for hardware devices, fingerprint, or face recognition schemes as this approach has a built-in higher level of security. The latter methods can still be added as an add-on to further bolster the security of the login process.

Enterprises already use SSO to make it easy for their employees to login to their various internal application that each require login. Existing solutions rely on password based authentication. And some require changing the password every few weeks or months. Some even prevent reusing the previous 10 passwords, making it extremely painful to employees. While this improves the security, it imposes unnecessary burden on the employees.

In one embodiment, a novel split key based signature scheme is used that requires two separate signatures from two split keys (of the primary key) to create the combined signature. These partial signatures are constructed on two separate devices to enhance the security. Compromise of one key doesn't result in the compromise of the primary key. This technique can be used to provide authentication service to existing SSO servers.

Below is the outline of the first-time registration and subsequent login processes. Registration: 1) User accesses the SSO login page in the browser. 2) User is presented with the familiar login form. 3) User does the login by entering username and password. 4) At this time, the SSO server will work with blockchain IDP server and identify the user needs to register into the split key IDP service. 5) Blockchain IDP provides a session ID and a challenge tracking that the SSO server sends to the User. 6) User's browser redirects and opens a desktop app. 7) The desktop app has the ability to connect to a mobile device via a short range wireless connection, for example, a bluetooth protocol or near field communications protocols. 8) The desktop will sign the challenge partial key and send the signature to the mobile. 9) The mobile will sign the challenge with its own partial key, combine the signatures and respond back to the blockchain IDP server along with the primary public key. 10) The blockchain IDP server confirms that the signature is valid with respect to the public key and registers the phone and the public key against the user. 11) Blockchain IDP server responds to SSO of the successful registration. 12) SSO server redirects the user to the application.

Password-less Login: 1) User accesses the SSO login page in the browser. 2) User is presented with the familiar login form. In addition, there will be a link to use the split key based authentication (note that this extra step of clicking the link can be bypassed if there is a cookie information from a prior session that user is already setup for split key authentication). 3) SSO server works with blockchain IDP server and provides a challenge. This will happen either directly as a response to step 1 or after user explicitly clicks the link to use split key authentication in step 2 (that depends on the cookie information). 4) Browser redirects and opens the desktop app. 5) The flow from here is same as the Registration process from step 7.

Note that the desktop app is only required at this time because of the local communication with the mobile phone. As Web Bluetooth API becomes widely adopted, the desktop app can be completely eliminated and the communication will happen directly between the browser and the mobile phone.

Also, in the above description, the SSO server and blockchain IDP service are mentioned as two separate servers. However, it is also possible to make blockchain IDP service available as a pluggable module into existing SSO solutions.

Figure 10:
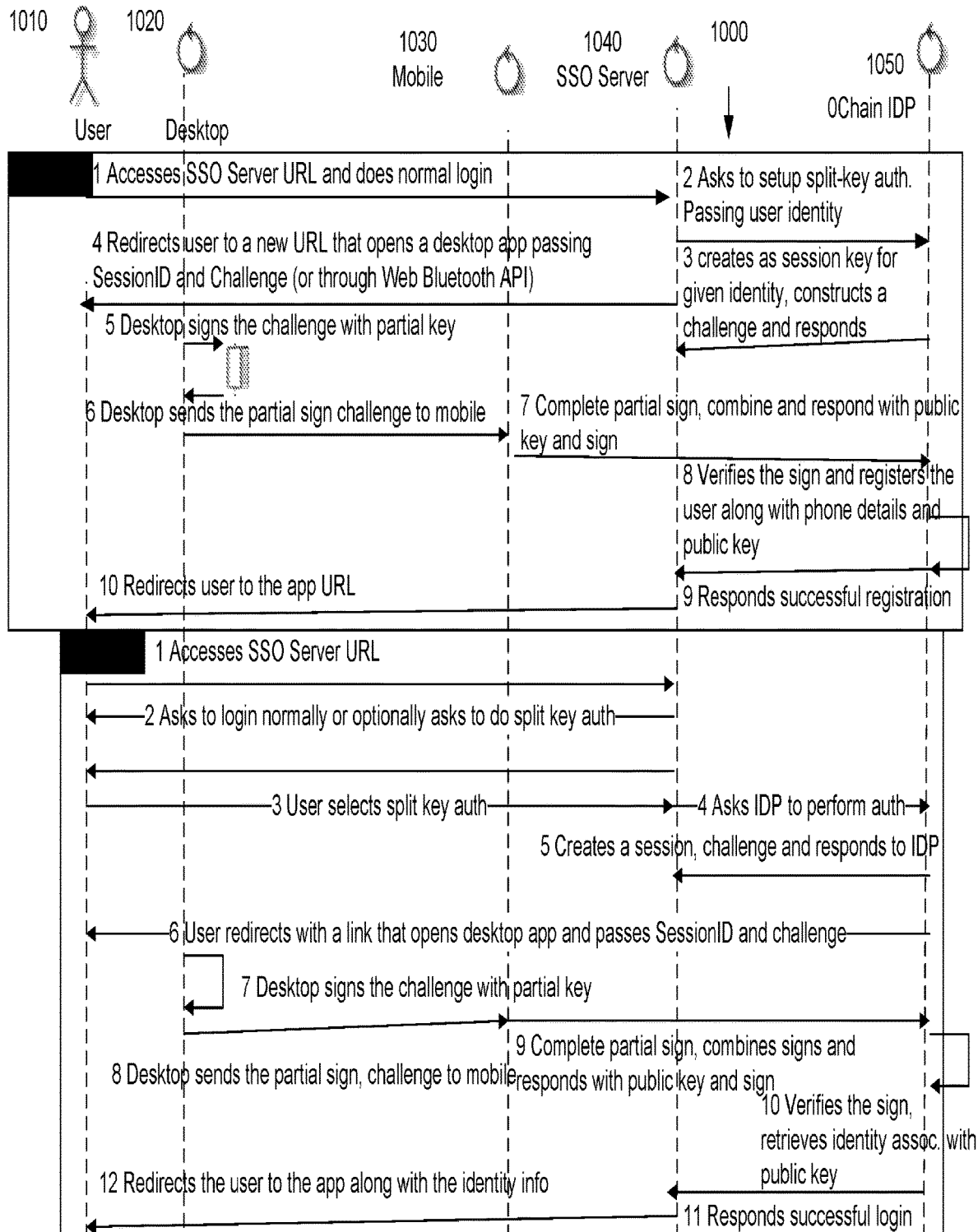
FIG. 10 discloses messaging flow for password less login using split-keys, according to one embodiment.

FIG. 10 shows the message flow 1000 for split-key authentication according to one embodiment. At 1010 is the user, 1020 is the desktop or first device of the user, 1030 is the second device or mobile of the user, 1040 is the Single-sign on ("SSO") server, 1050 is the Blockchain IDP Server. The figure shows Register and Login events and corresponding message flow according to one embodiment.

Figure 11:
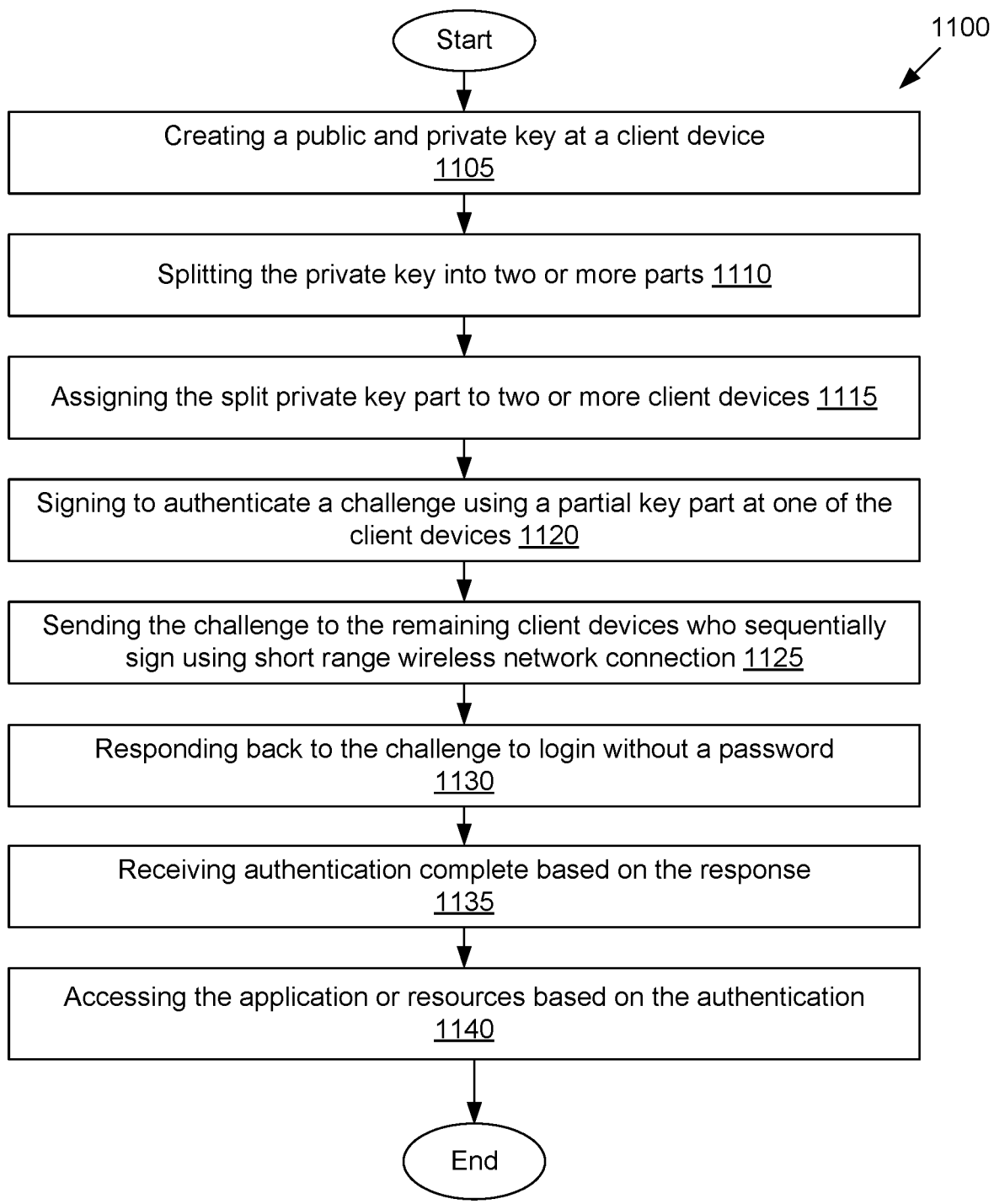
FIG. 11 is a flow chart showing different method steps in implementing password less login using split-keys, according to one embodiment.

FIG. 11 is depicts a flowchart 1100 illustrating an example of a method for a blockchain platform to achieve split-key authentication and passwordless login, according to one embodiment. The flowchart 1100 is discussed in conjunction with the blockchain platform environment shown in the diagram 100 in FIG. 1. At block 1105, for a given client login, create a public and private key at a client device. At block 1110, split the private key of the client into two or more parts. At block 1115, assign the split private key part to two or more client devices. At 1120, signing to authenticate a challenge using a partial key part at one of the client devices. At 1125, send the challenge to the remaining client devices who sequentially sign using short range wireless network connection, for example, Bluetooth protocol or near field communication. At 1130, respond back to the challenge to login without a password. At 1135, receive authentication complete based on the challenge. At 1140, getting access to the application or resources based on the authentication.

In broad embodiment, the invention is systems and methods of a blockchain platform for intermediaries to provide different services including proxy re-encryption, independent audit services, multi-sig smart wallet and split-key based passwordless login.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures.

The above-described functions and components may be comprised of instructions that are stored on a storage medium such as a computer readable medium. The instructions may be retrieved and executed by a processor. Some examples of instructions are software, program code, and firmware. Some examples of storage medium are memory devices, tapes, disks, integrated circuits, and servers. The instructions are operational when executed by the processor to direct the processor to operate in accord with some embodiments. Those skilled in the art are familiar with instructions, processor(s), and storage medium.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

A detailed description of one or more implementations of the invention is provided here along with accompanying figures that illustrate the principles of the invention. The invention is described in connection with such implementations, but the invention is not limited to any implementation. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The structures and modules in the figures may be shown as distinct and communicating with only a few specific structures and not others. The structures may be merged with each other, may perform overlapping functions, and may communicate with other structures not shown to be connected in the figures.

What is claimed is:

1. A method of blockchain platform for authenticating clients at a server without a login password, comprising of:
    creating a public and private key at a first client device wherein the first client device is a generator of keys;
    splitting the private key into two or more parts in the first client device;
    assigning the split private key part to two or more client devices including the first client device and a remaining client devices;
    signing to authenticate a challenge using a partial key part at the first client device;
    sending the challenge to the remaining client devices wherein the remaining client devices who sequentially sign using short range wireless network connection; and
    responding back to the challenge to the first client device to set up the two or more client devices for subsequent transactions to be signed by the first client device and the remaining client devices sign the signed transactions back to the first client where the first client combines the signatures and sends the signed transaction to the server.

2. A system of blockchain platform for authenticating clients at a server without a login password, comprising of:
    one or more processors;
    a memory coupled to at least one of the processors;
    a network interface that connects the local node to one or more remote nodes; and
    a set of computer program instructions stored in the memory and executed by at least one of the processors in order to perform actions comprising:
    a module to create a public and private key at a first client device wherein the first client device is a generator of keys;
    a module to split the private key into two or more parts in the first client device;
    a module to assign the split private key part to two or more client devices including the first client device and a remaining client devices;
    a module to sign to authenticate a challenge using a partial key part at the first client device;
    a module to send the challenge to the remaining client devices wherein the remaining client devices who sequentially sign using short range wireless network connection; and
    a module to respond back to the challenge to login to the first client device to set up the two or more client devices for subsequent transactions to be signed by the first client device and the remaining client devices sign the signed transactions back to the first client where the first client combines the signatures and sends the signed transaction to the server.

* * * * *